July 17, 1956

C. F. HARRIS 2,754,950

CHECK CONTROLLED LIQUID DISPENSER

Filed Oct. 9, 1948

CHARLES F. HARRIS
INVENTOR.

BY Edmund W. E. Kamm
ATTORNEY

July 17, 1956

C. F. HARRIS 2,754,950

CHECK CONTROLLED LIQUID DISPENSER

Filed Oct. 9, 1948

CHARLES F. HARRIS
*INVENTOR.*

BY Edmund W. E. Kamm
ATTORNEY

July 17, 1956 C. F. HARRIS 2,754,950
CHECK CONTROLLED LIQUID DISPENSER
Filed Oct. 9, 1948 14 Sheets-Sheet 3

CHARLES F. HARRIS
INVENTOR.

BY Edmund W. E. Kamm
ATTORNEY

July 17, 1956  C. F. HARRIS  2,754,950
CHECK CONTROLLED LIQUID DISPENSER
Filed Oct. 9, 1948  14 Sheets-Sheet 4

CHARLES F. HARRIS
INVENTOR.

BY Edmund W. E. Kamm
ATTORNEY

July 17, 1956  C. F. HARRIS  2,754,950
CHECK CONTROLLED LIQUID DISPENSER
Filed Oct. 9, 1948  14 Sheets-Sheet 5

CHARLES F. HARRIS
INVENTOR.

BY Edmund W. E. Kamm
ATTORNEY

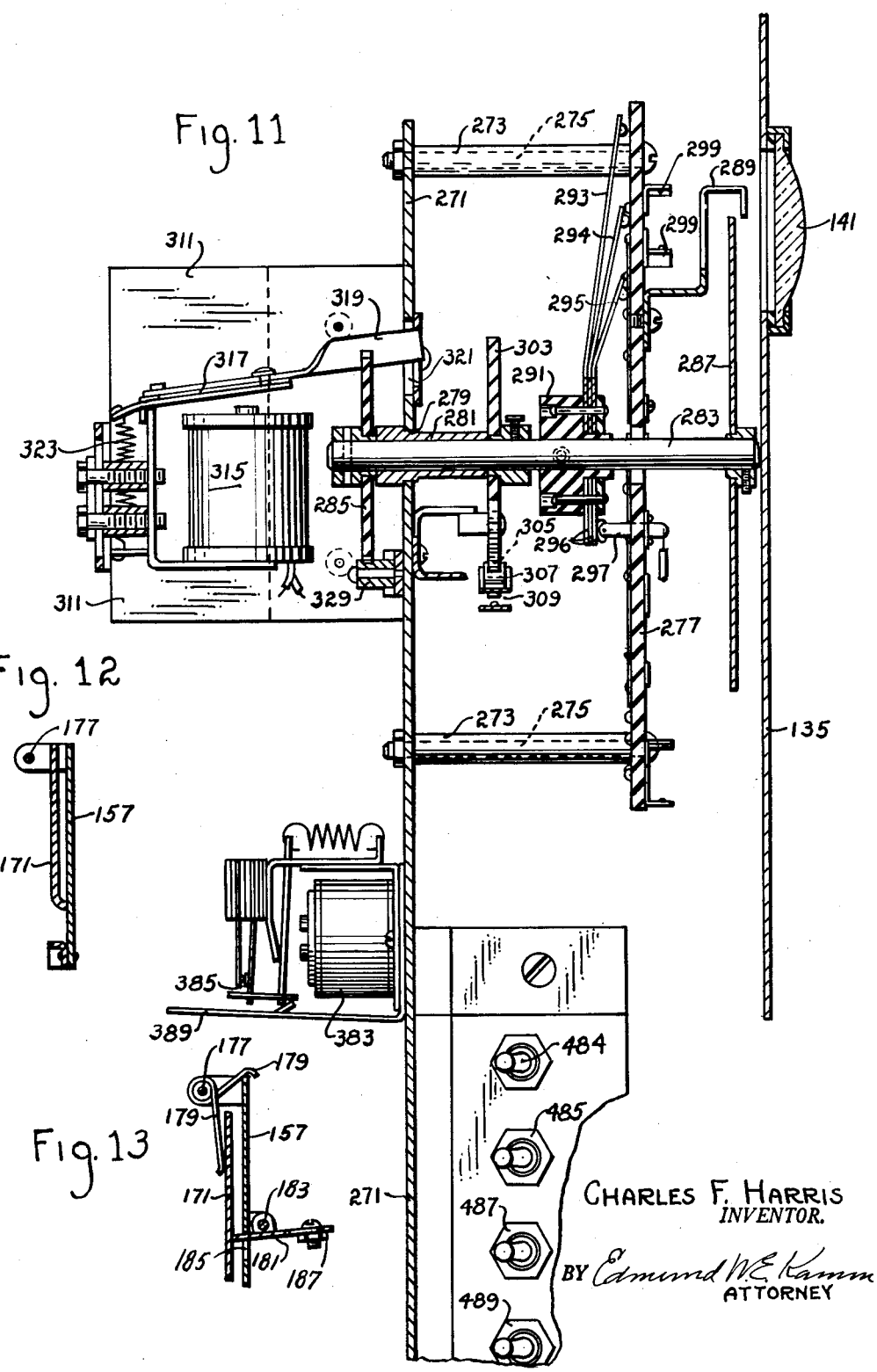

July 17, 1956  C. F. HARRIS  2,754,950
CHECK CONTROLLED LIQUID DISPENSER
Filed Oct. 9, 1948  14 Sheets-Sheet 7
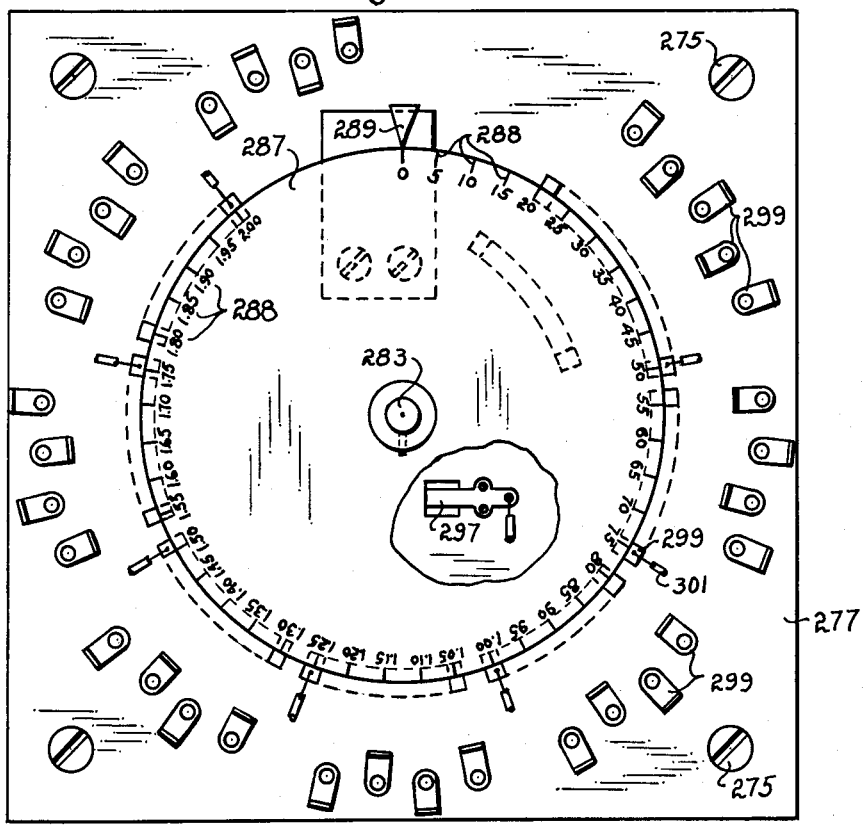
Fig. 14
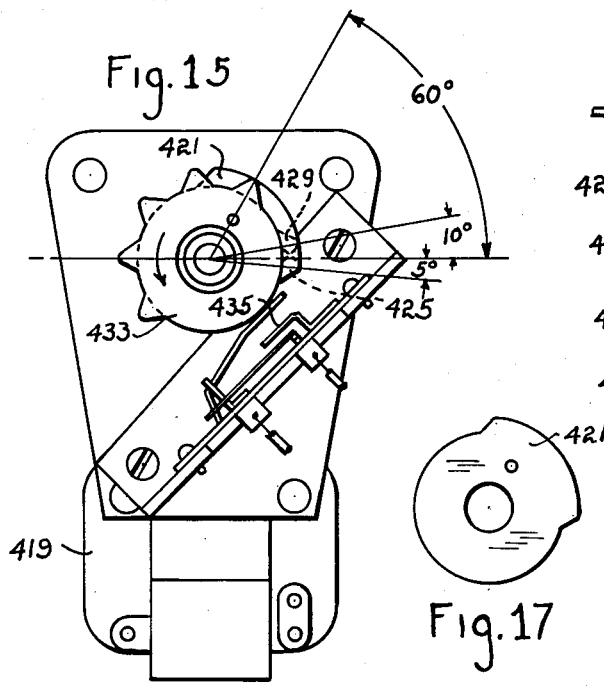
Fig. 15
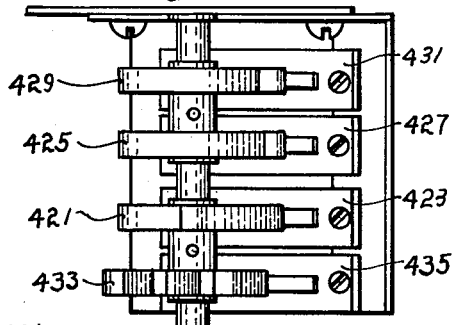
Fig. 16
Fig. 17
CHARLES F. HARRIS
INVENTOR.
BY Edmund W. E. Kamm
ATTORNEY July 17, 1956
C. F. HARRIS
2,754,950
CHECK CONTROLLED LIQUID DISPENSER
Filed Oct. 9, 1948
14 Sheets-Sheet 8
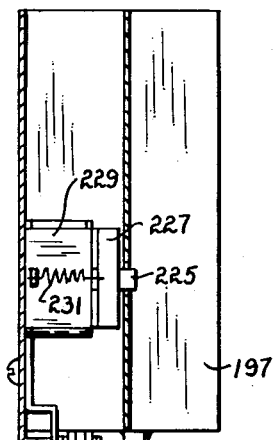
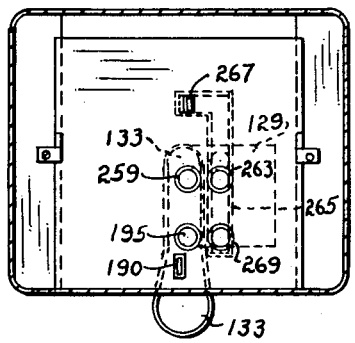
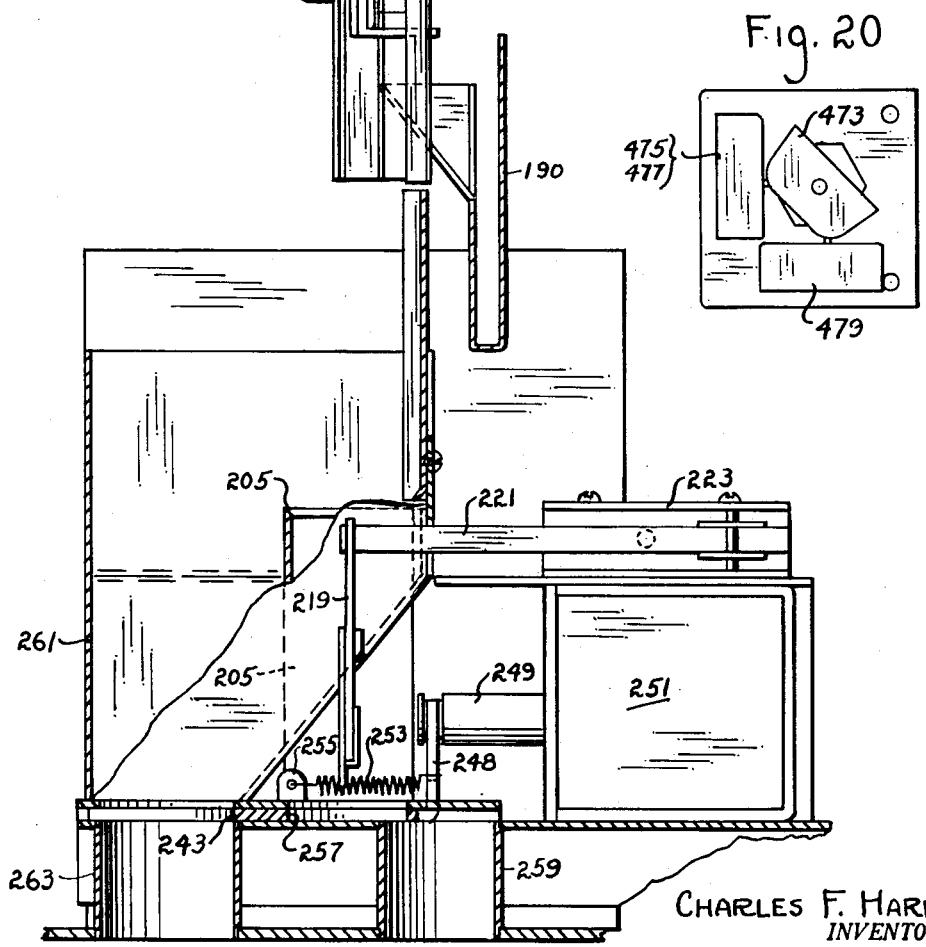
CHARLES F. HARRIS
INVENTOR.
BY Edmund W.C. Kamm
ATTORNEY July 17, 1956 C. F. HARRIS 2,754,950
CHECK CONTROLLED LIQUID DISPENSER
Filed Oct. 9, 1948 14 Sheets-Sheet 9
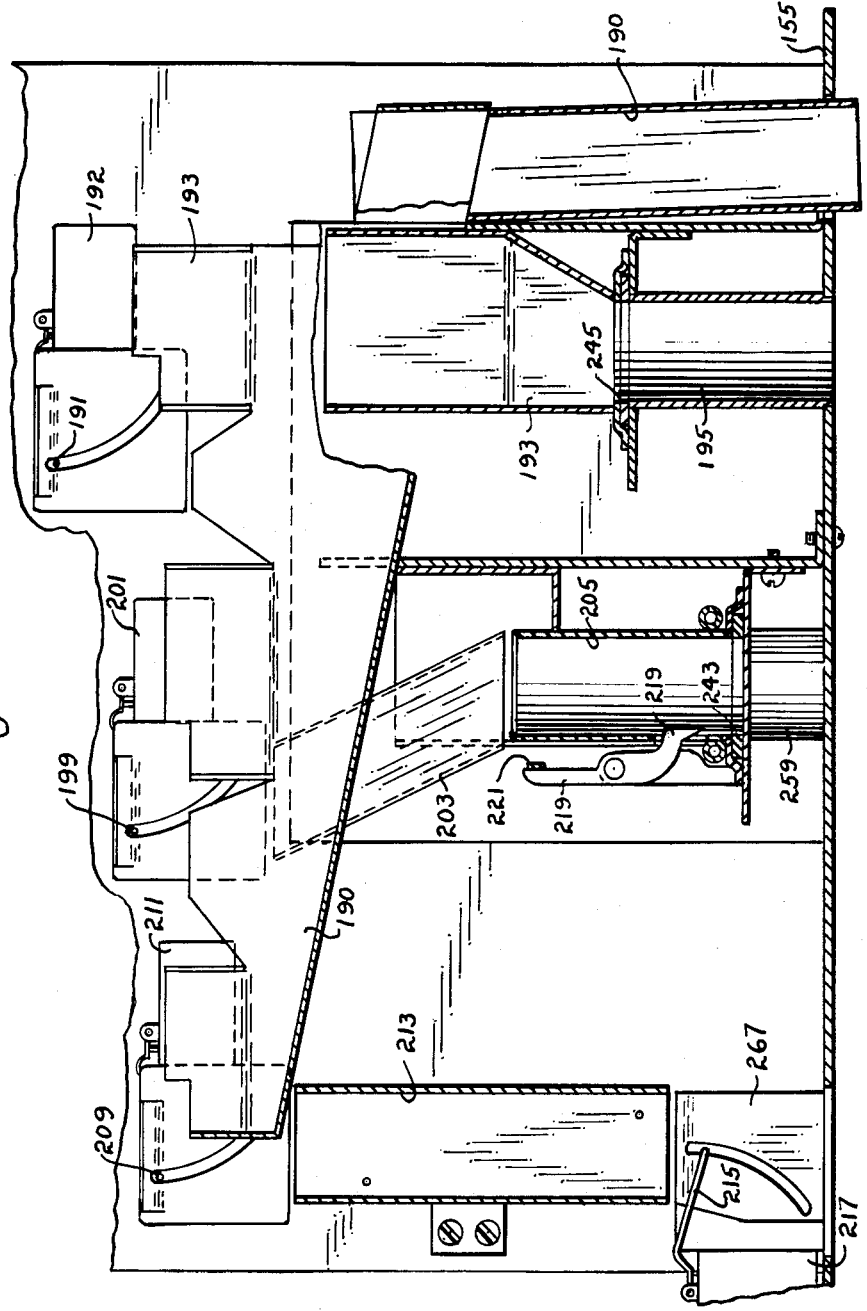
CHARLES F. HARRIS
INVENTOR.
BY Edmund W. E. Kamm
ATTORNEY

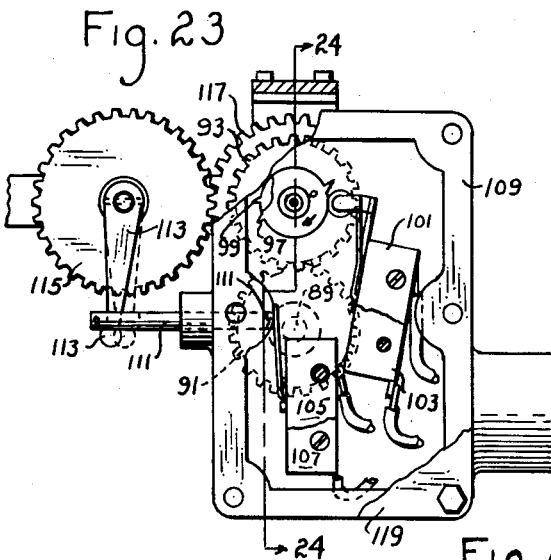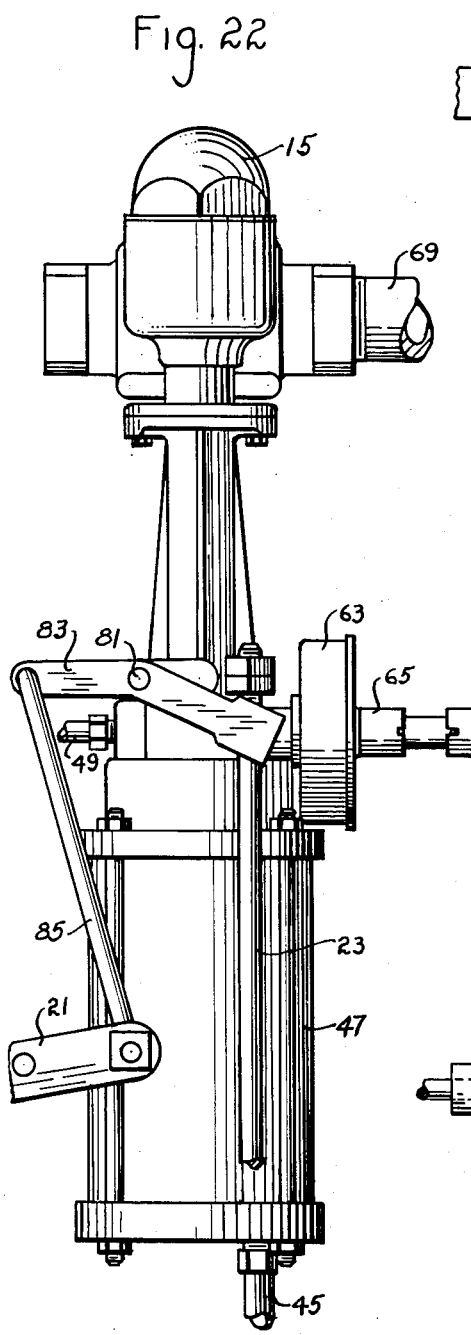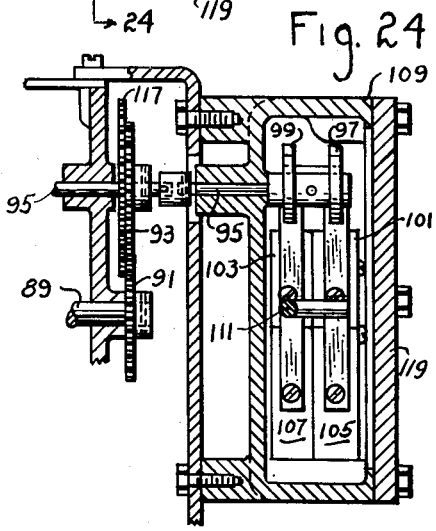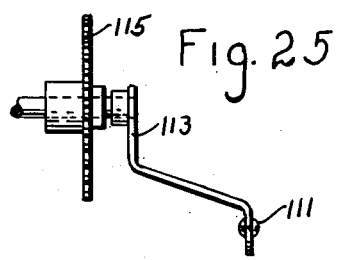

July 17, 1956

C. F. HARRIS 2,754,950

CHECK CONTROLLED LIQUID DISPENSER

Filed Oct. 9, 1948

Charles F. Harris
INVENTOR.

BY Edmund W. C. Kamme
ATTORNEY

July 17, 1956  C. F. HARRIS  2,754,950
CHECK CONTROLLED LIQUID DISPENSER
Filed Oct. 9, 1948  14 Sheets-Sheet 12

CHARLES F. HARRIS
INVENTOR.

BY Edmund W.C. Kamm
ATTORNEY

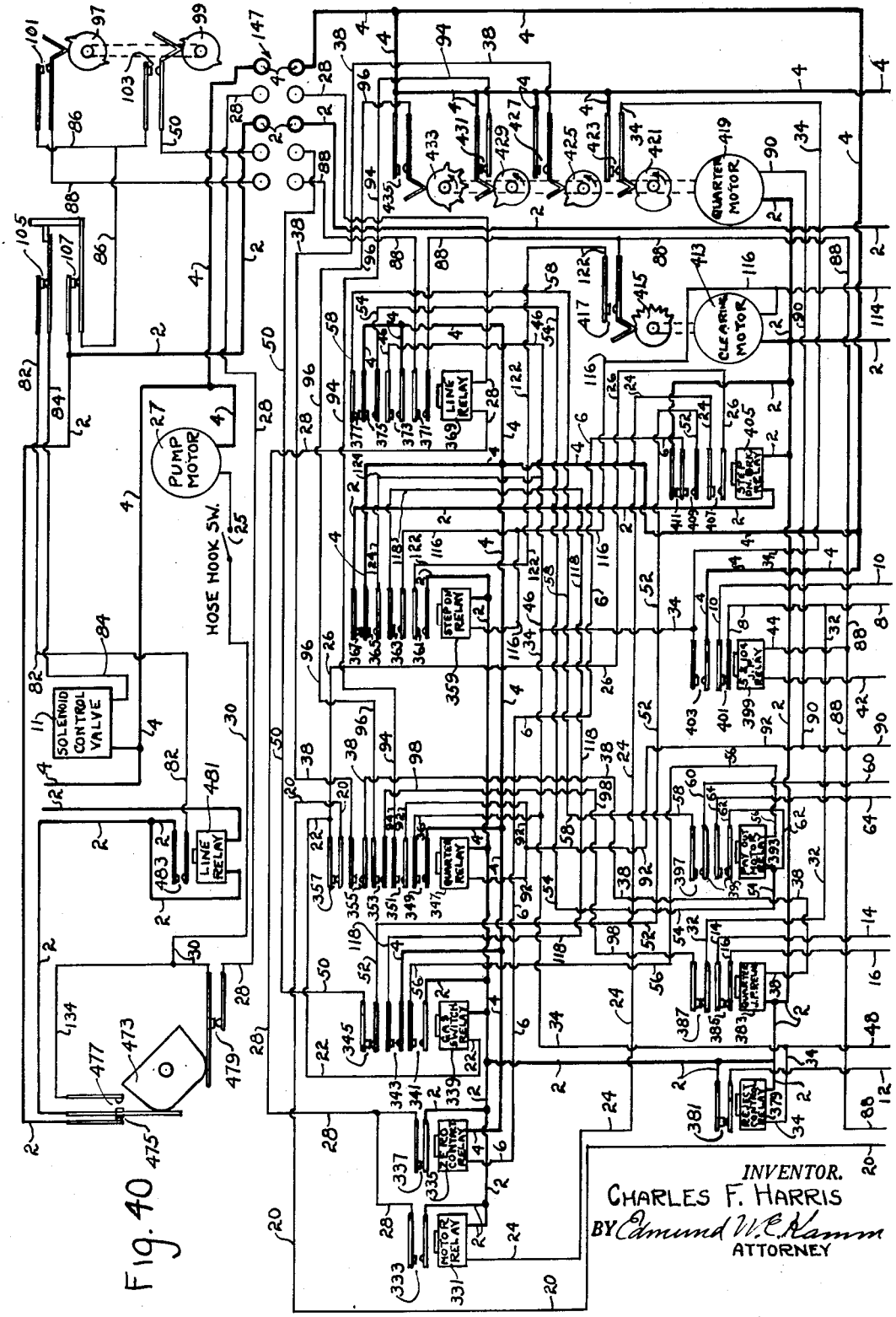

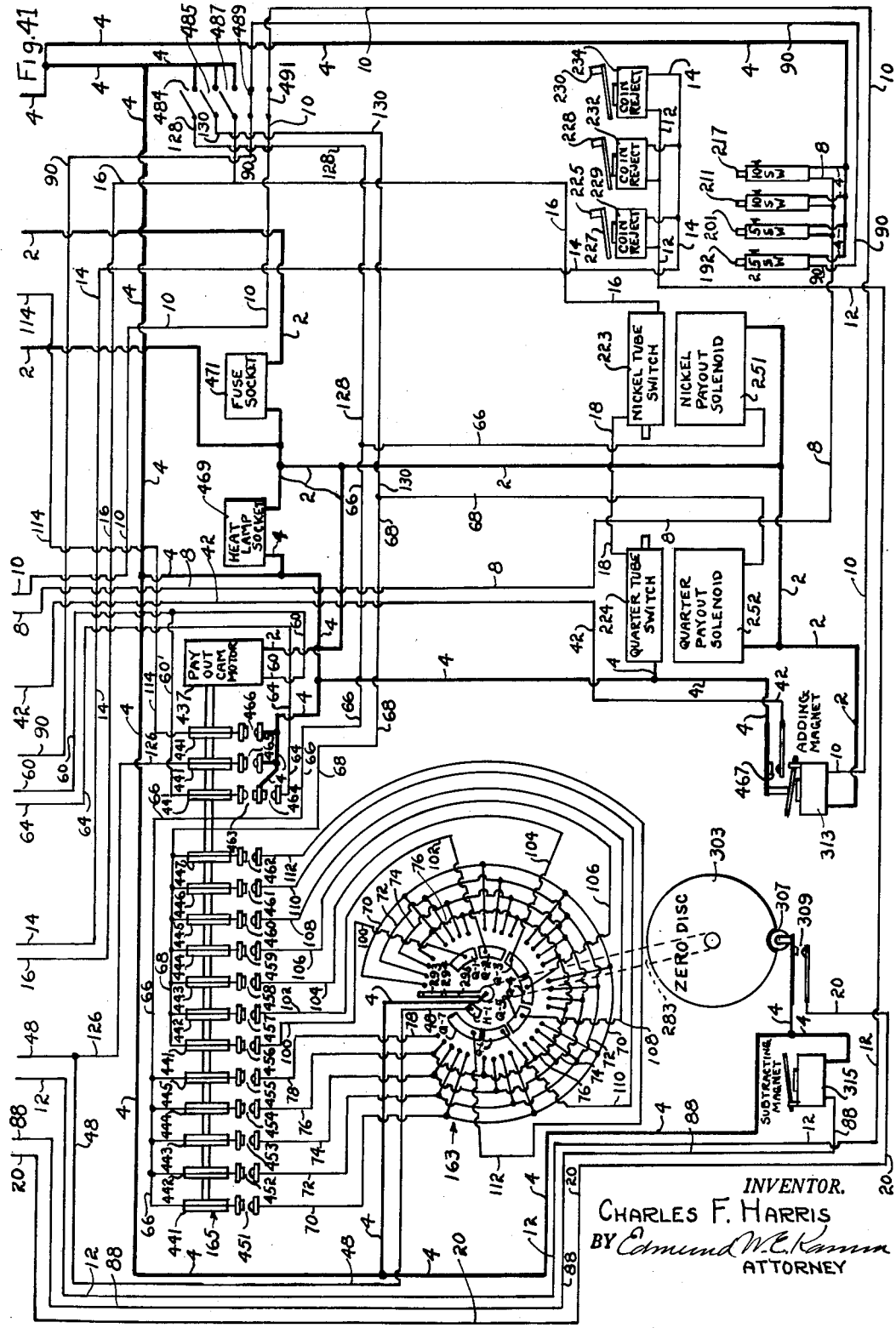

United States Patent Office 2,754,950
Patented July 17, 1956

2,754,950

CHECK CONTROLLED LIQUID DISPENSER

Charles F. Harris, Chicago, Ill.

Application October 9, 1948, Serial No. 53,626

17 Claims. (Cl. 194—13)

This invention relates to check controlled liquid dispensers. More specifically it relates to a gasoline dispenser which is conditioned upon the deposit of coins, to dispense the prepaid amount of fuel, which will stop dispensing when the prepaid amount has been dispensed, and which will return coins in change, should the prepaid amount of fuel not be dispensed.

It is an object of the invention to provide means for presetting the dispenser in response to the deposit of nickels, dimes and quarters.

It is another object of the invention to provide a dispenser which will return change in nickels and quarters.

Still another object of the invention is to provide a dispenser which may be operated by the deposit of coins as a self-service unit, or by a simple adjustment may be operated manually as a conventional dispenser.

Another object of the invention is to provide means in said dispenser for preventing the simultaneous dispensing of fuel and returning of change.

Still another object of the invention is to provide automatic resetting of the register prior to dispensing.

A further object of the invention is to prevent operation of the apparatus prior to or during resetting.

Yet another object of the invention is to provide a simple but effective electrical change issuing mechanism.

Another object of the invention is to provide suitable slug rejecting means.

It is a further object of the invention to provide means for rejecting coins while the dispenser is in operation to discharge either liquid or change.

It is yet another object of the invention to provide means for preventing overdelivery of either coins or liquid in case a coin switch sticks closed.

A further object of the invention is to condition the return of change upon the return of the hose hook to its "off" or nozzle supporting position.

Yet another object of the invention is to provide means operated by the conventional computing register to reduce the prepaid credit in accordance with the money value of the liquid dispensed, computed at the current price.

These and various other objects will become apparent from a study of this specification and the drawings which are attached hereto and are made a part hereof and in which:

Figure 11 is a sectional view of the credit switching mechanism and its actuating mechanism showing also the manual and auditing control switches.

Figure 12 is a sectional view of the coin guide taken substantially on the line 12—12 of Figure 7.

Figure 13 is a sectional view of the coin dropping gate taken substantially on the line 13—13 of Figure 7.

Figure 14 is an elevation of the terminal side of the credit switching mechanism showing the credit indicating dial and pointer.

Figure 15 is an elevation of the control motor and its switches.

Figure 16 is a top view of the structure of Figure 15.

Figure 17 is an elevation of the override cam.

Figure 18 is an end elevation with parts in section showing the coin handling and payout system.

Figure 19 is a plan view of the coin payout system.

Figure 20 is an elevation of the selector switch mechanism which permits either manual or coin operation.

Figure 21 is a side elevation, partly in section, of the change tubes and the coin switches.

Figure 22 is a side elevation of the hydraulic register resetting mechanism.

Figure 23 is an elevation with parts broken away of the credit step down and neutralizing switches and their drives.

Figure 24 is a sectional view taken on the line 24—24 of Figure 23.

Figure 25 is an elevation of the neutralizing switch actuator.

Figure 30:
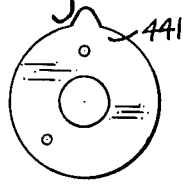
Figure 31:
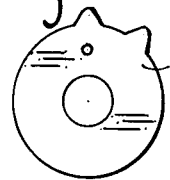
Figure 32:
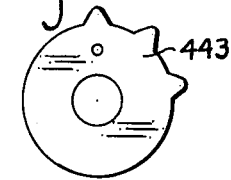
Figure 33:
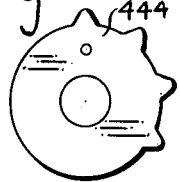
Figure 34:
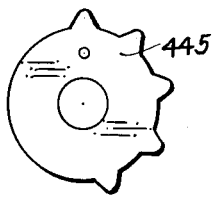
Figure 35:
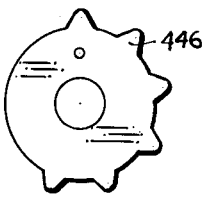
Figure 36:
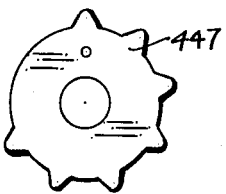
Figure 37:
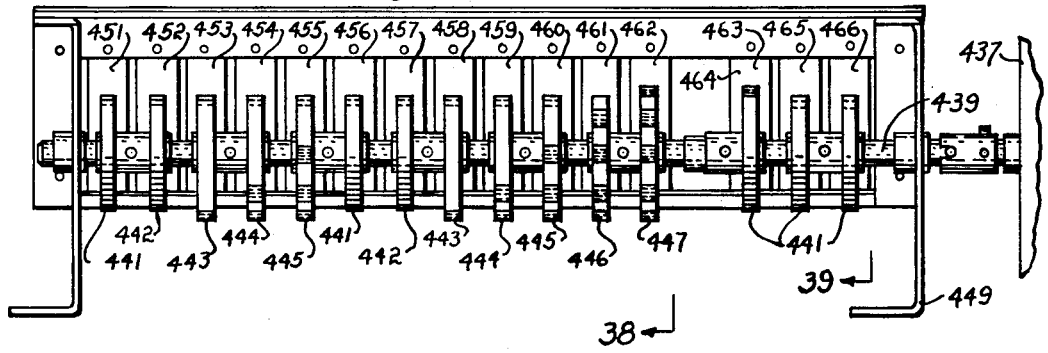

Figure 30 is an elevation of a one lobe payout cam.
Figure 31 is an elevation of a two lobe payout cam.
Figure 32 is an elevation of a three lobe payout cam.
Figure 33 is an elevation of a four lobe payout cam.
Figure 34 is an elevation of a five lobe payout cam.
Figure 35 is an elevation of a six lobe payout cam.
Figure 36 is an elevation of a seven lobe payout cam.
Figure 37 is a rear elevation of the payout cams assembled with their switches.

Figure 38:
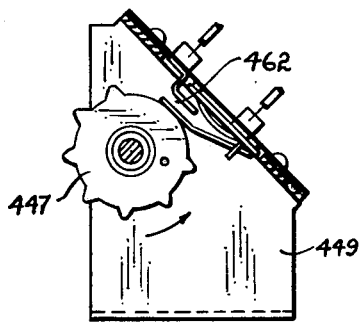

Figure 38 is a sectional view taken substantially on line 38—38 of Figure 37.

Figure 39:
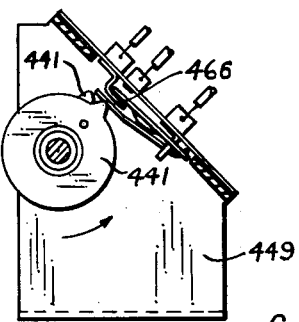

Figure 39 is a sectional view taken substantially on line 39—39 of Figure 37.

Figure 40 is a diagram of the pump pedestal wiring and part of that in the control pedestal.

Figure 41 is a diagram of the remainder of the control pedestal wiring.

THE DISPENSER

Figure 1:
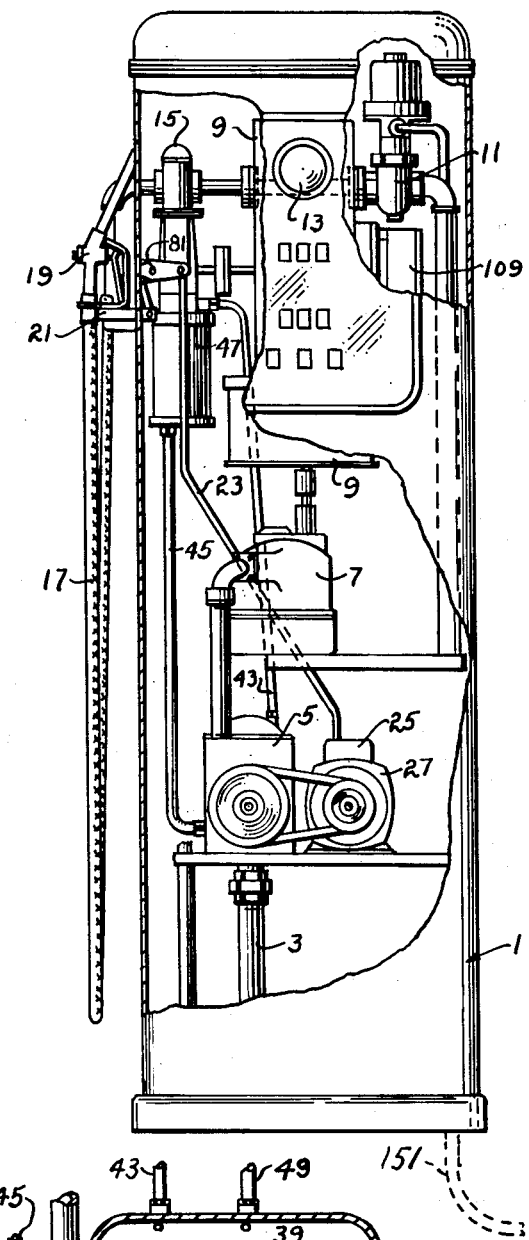
Figure 1 is a front elevation of the dispenser proper with parts broken away to show the essential elements.

Referring to Figure 1, the numeral 1 represents a liquid dispenser having a suction pipe 3, a combined pump and an air separator 5, a meter 7, a computing register 9, a quick acting solenoid valve 11, a flow sight 13, a reset valve 15 and a discharge hose 17 terminating in a nozzle 19 which is supported on the conventional hose hook 21. The latter is connected by a rod 23 to actuate the switch 25 of the pump motor 27.

Figure 3:
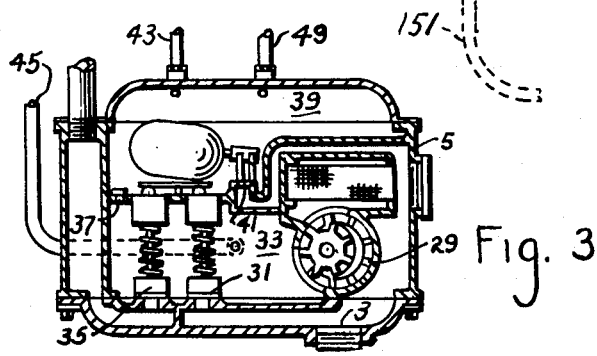
Figure 3 is a sectional view of the combined liquid pump and air separator.

The combined pump and air separator shown in detail in Figure 3 is substantially the same as that shown in detail in the patent to Bechtold, No. 2,194,843, issued March 26, 1940, for Liquid Dispensing Apparatus. It comprises the suction pipe 3, a rotary pump 29 having a by-pass valve 31 in the air separator chamber 33, which is under pressure, an outlet valve 35 which admits liquid to the meter when the pressure in the chamber reaches a predetermined minimum, an air orifice 37 which leads to chamber 39 which has a float controlled valve 41 for returning liquid to the suction side of the pump and a vent line 43 to atmosphere.

Figure 26:
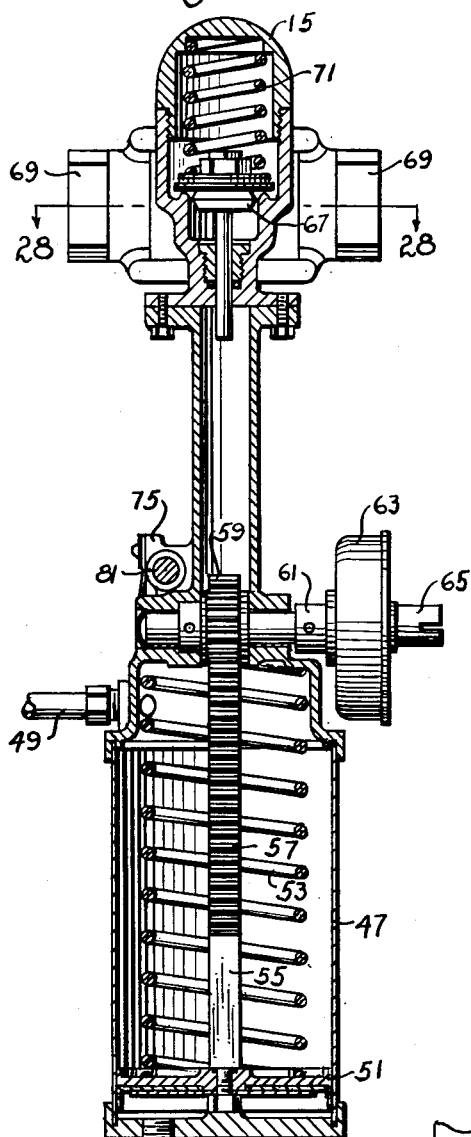
Figure 26 is a sectional view of the hydraulic resetting mechanism in its position preparatory to resetting the register.
Figure 27:
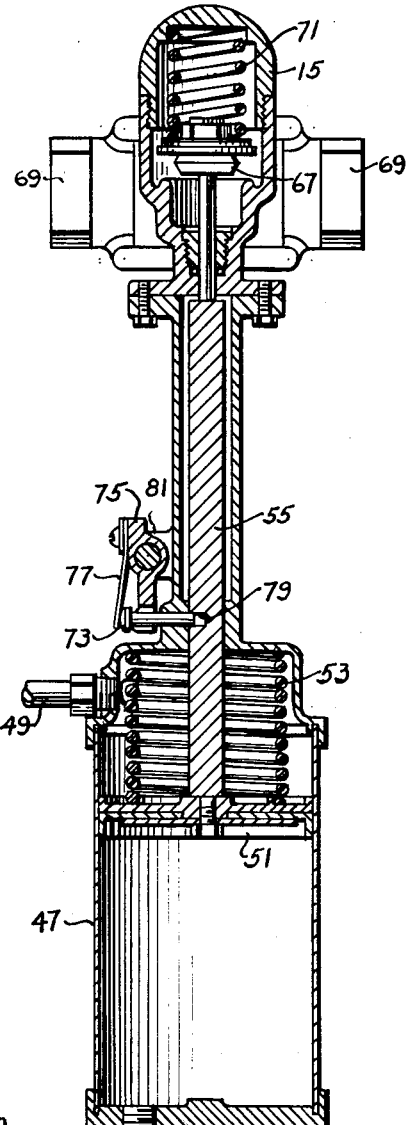
Figure 27 is a view of the mechanism of Figure 26 after the register is reset.
Figure 28:
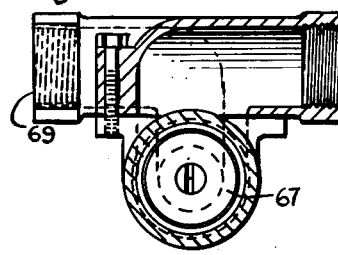
Figure 28 is a sectional view taken substantially on the line 28—28 of Figure 26.
Figure 29:
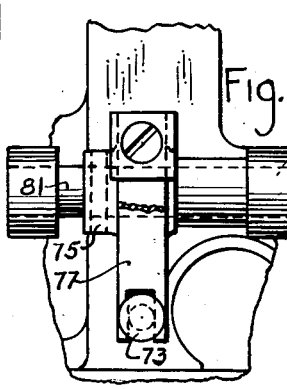
Figure 29 is a partial elevation of the rack latching means.

A liquid pressure line 45 leads from chamber 33 to the bottom of the hydraulic reset cylinder 47 (Figures 22, 26 and 27) and a drain line 49 connects the top of the reset cylinder with the vent chamber 39.

The reset mechanism comprises the cylinder 47 in which operates a piston 51 which is raised by liquid entering the cylinder from pipe 45 and which upon rising compresses a spring 53. The piston rod 55 is formed as a rack at 57 and actuates pinion 59, shaft 61 and the clutch 63. The latter is an overload type of clutch which will release the driven shaft 65 when the latter is stopped as will be explained below. This clutch is fully set forth in the application of Hill and Foss, Serial No. 731,636, filed February 28, 1947, now Patent No. 2,595,259.

The rack when it is raised lifts a valve 67, which controls the flow of liquid through the line 69 leading to the hose, against its spring 71 which normally closes the valve.

Drain line 49 serves to remove any liquid which escapes past piston 51 and rises to a level above the inlet to the line.

A latching pin 73 is held in a lever 75 by a spring 77 and is adapted to enter a hole 79 in the rack to hold it in actuated position (Figure 27) to prevent operation of the piston as the fluid pressure varies during dispensing, thereby preventing partial resetting of the register. The lever is actuated by shaft 81 (see also Figures 1 and 22) and the switch lever 83 which is in turn actuated by the hose hook 21 and link 85.

Driven shaft 65 of the clutch actuates the resetting shaft 87 (Figure 22) of the computer and, as is well known in the art, closes shutters (not shown) over the indicators and resets the indicators to a zero stop so that the zeros on the wheels are aligned with the dial openings. When the stop is reached the clutch will release the shaft which will then be returned in an opposite direction by a spring in the computer to reopen the shutters. The structure of the computer may be that set forth in Patent No. 2,213,597, issued September 3, 1940, to E. A. Slye, for Computing Counter.

The computer also has a shaft 89 (Figures 23 and 24) which is driven one revolution for each ten cents worth of fluid dispensed and this shaft is connected by 1 to 1 ratio gears 91, 93 to drive a shaft 95 which has two, two-lobe cams 97 and 99 fixed to it.

Cam 97 operates to close a normally open credit reduction or step down switch 101 once for each half revolution so that five cents will be deducted from the established credit for each half revolution of the shaft.

Cam 99 operates to close a normally open stop switch 103 once for each half revolution. This switch has no effect until all of the credit is exhausted whereupon it operates in a manner later to be described to stop dispensing.

The cams rotate clockwise (Figure 23) and it will be seen that the lobes of the cams are circumferentially spaced so that the lobe of cam 99 leads the adjacent lobe of cam 97 by about 36 degrees.

A normally closed disabling switch 107 is mounted beside a normally closed solenoid control switch 105 in the same case 109 as the switches 101 and 103. The operating levers of these switches are actuated simultaneously by a push rod 111 which extends through the case and is actuated by a lever 113 which is in turn moved by gears 115, 117 and other mechanism not shown which forms a part of the resetting mechanism of the computer. At the start of the resetting operation the push rod is moved to the right (Figure 23) to the dotted line position and held in this position until resetting is completed whereupon it is again restored to the full line position. The purpose of this mechanism is to open switches 105 and 107 to prevent dispensing or reduction of credit during the resetting operation and is necessary because the cams 97 and 99 are rotated during resetting.

The case 109 is fitted with a tight cover 119 and is entirely of explosion-proof construction.

Figure 2:
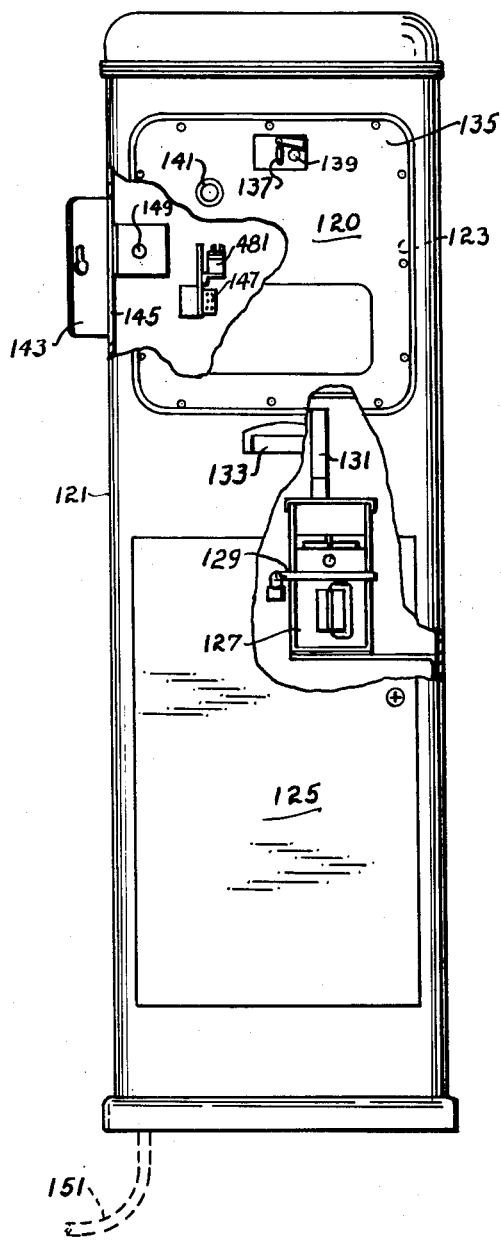
Figure 2 is a front elevation of the control pedestal with parts broken away to show certain elements.

THE CONTROL PEDESTAL (Figure 2)

The control mechanism 120 including the coin receiving and change making means is enclosed in a pedestal 121 which has an opening 123 for reception of the mechanism and a door 125 which gives access to the lower portion of the pedestal.

A coin safe 127 is supported so as to be accessible through the door and is locked in place by a hasp 129.

A coin chute 131 conducts coins collected by the mechanism 120 into the safe.

A coin return chute 133 is fixed in the pedestal and is accessible from the exterior thereof so that any rejected coins or change issued by the machine can be secured by the customer.

The front plate 135 of the mechanism has a coin receiving slot 137 and a coin return button 139 as well as a bulls-eye 141 through which the amount of credit set up on the mechanism is indicated.

A door 143 is hinged to the side of the housing and can be locked in position to close opening 145 which gives access to the multiple connector 147 and the manual to automatic switch mechanism 149. A conduit 151 carries the wires which connect the dispenser 1 and the pedestal 121.

THE CONTROL MECHANISM (Figures 4 to 21 and 30 to 39)

The control mechanism as a whole is indicated by numeral 120 and is assembled as a unit which can be inserted into the control pedestal.

Figure 4:
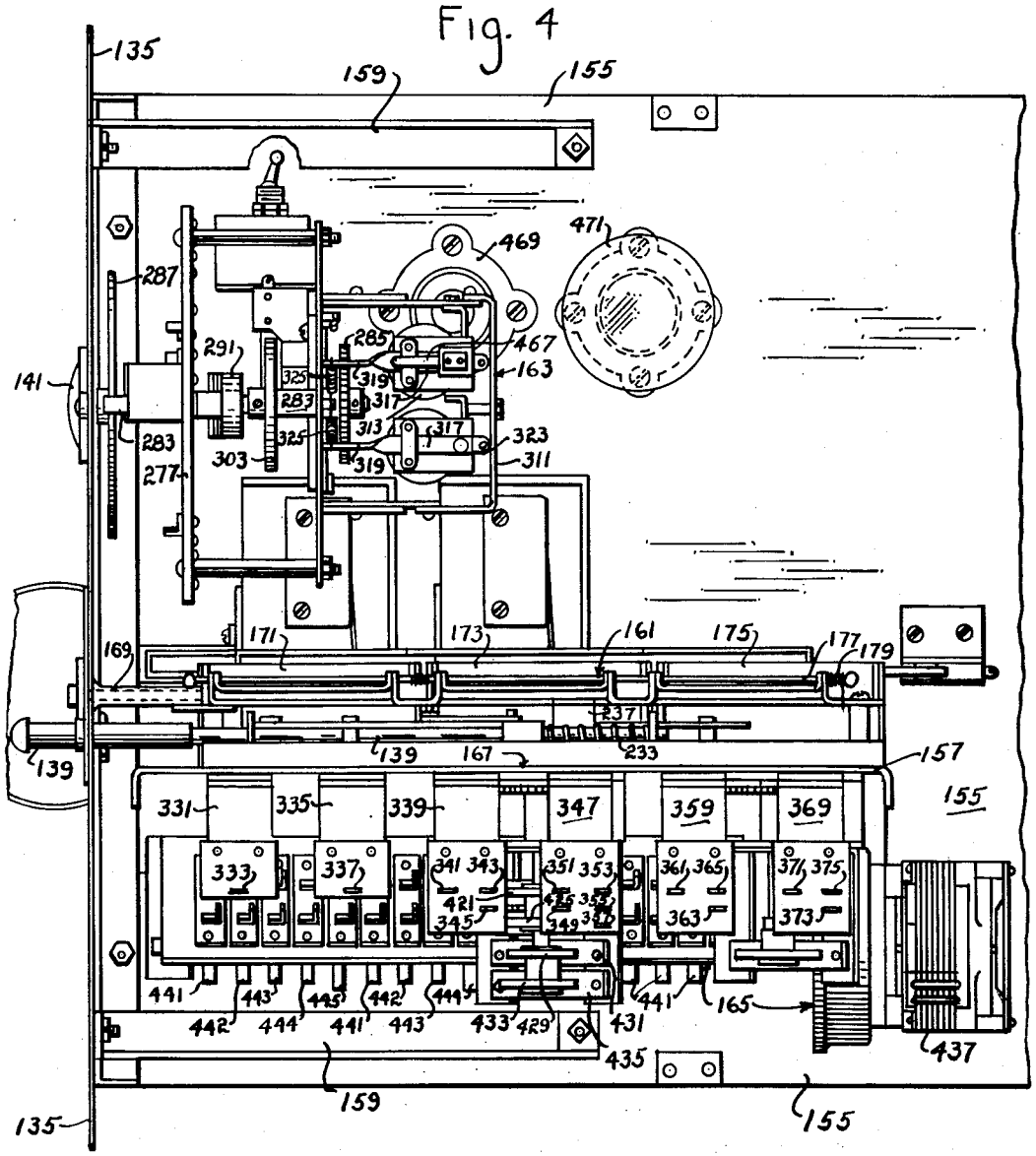
Figure 4 is a plan view of the control unit showing the credit, control, payout and other mechanism.
Figure 5:
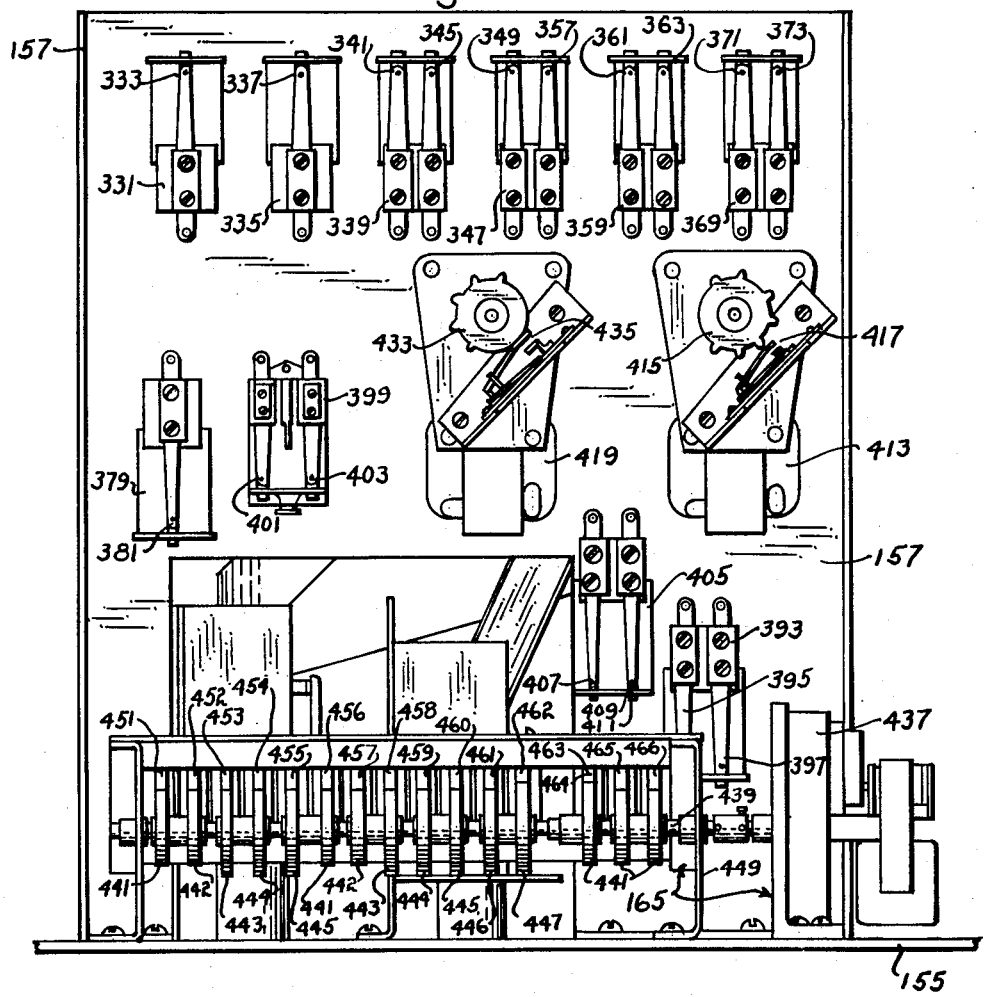
Figure 5 is an elevation of the control unit showing the relays, control motors, payout mechanism and other units as viewed from the bottom of Figure 4.
Figure 6:
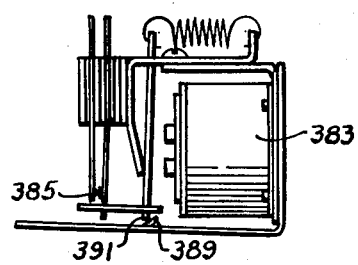
Figure 6 is an elevation showing a latching relay.
Figure 7:
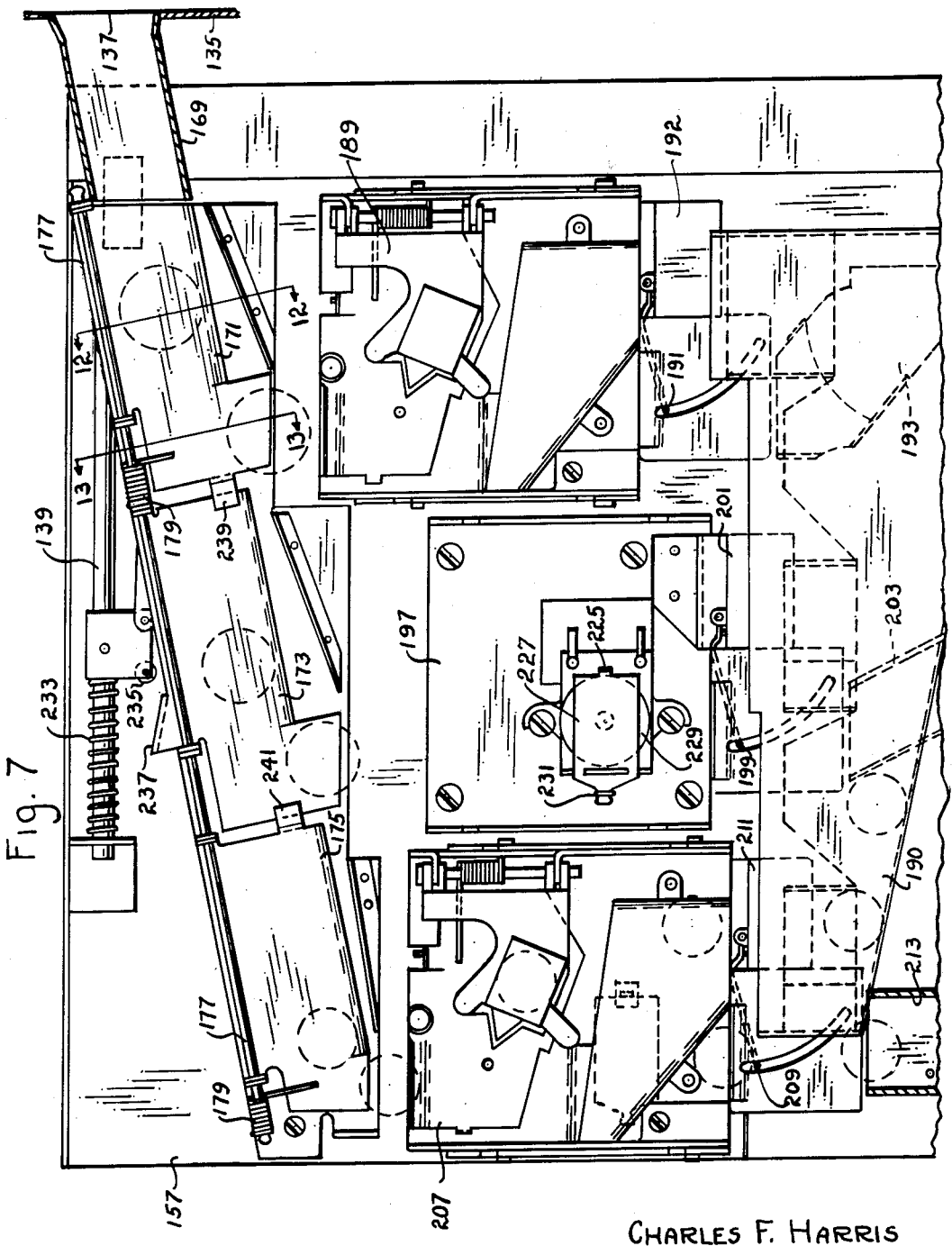
Figure 7 is a side elevation of the coin receiving, distributing and rejecting mechanisms as well as the coin switches and coin distributing guides viewed from the top of Figure 4, parts of the 10 cent slug rejector being omitted to show construction details.

As shown, particularly in Figures 4, 5 and 7, a sheet metal base 155 is provided with a vertical wall 157.

This wall and the base support the front plate 135 which is braced by brackets 159. All of the components are supported on these members.

An understanding of the control mechanism can best be imparted by breaking it into functional units and analyzing each unit. As best shown in Figure 4, the coin collection unit is indicated by numeral 161, the credit posting and subtracting unit or accumulator by 163, the change payout control unit by 165 and the general control panel by 167.

THE COIN COLLECTION UNIT (Figures 4, 7, 18, 19 and 21)

Quarter

As shown, particularly in Figures 4 and 7, all coins are inserted in the coin slot 137 and pass into the inclined distributor tube 169. The coins pass from this tube into a tunnel formed by the wall 157 on one side (Figures 12 and 13) and three chutes 171, 173 and 175 which are hinged on rod 177 fixed to the wall and held in place by springs 179. The rod is inclined downwardly from tube 169 so that the coins will pass through the chutes by gravity.

The bottom of the quarter chute 171 is open at the left end (Figure 7) but passage downwardly from the chute is barred by a gate 181, hinged at 183, which passes through a slot 185 in wall 157 and is held in place by a weight 187. The weight is such that it will be overcome by the weight of a quarter but not of a nickel or dime. A quarter will therefore drop into the slug rejector 189 which either rejects the coin by depositing it in the return chute 190 from which it returns to the receptacle 133 or passes it to actuator 191 of switch 192 which is momentarily closed to set up a 25¢ credit on the accumulator, as will be described below.

After passing the switch, the coin drops into the quarter magazine 193 (Figure 21). Coins are ejected therefrom through tube 195.

*Nickel*

The left end of the chute 173 is of similar construction and is fitted with a gate which is responsive to the weight of a nickel, but not of a dime, and discharges the nickels into a slug rejector not shown—removed for clarity—which is supported in bracket 197 (Figure 18) where it is either rejected, as described above, or actuates switch lever 199 to energize the switch 201 momentarily to produce one impulse on the accumulator. From here it passes by way of chute 203 into nickel magazine 205.

*Dime*

The bottom of the left end of chute 175 is open and is not provided with a gate since the dime is the lightest of the three coins used. It passes directly to a slug rejector 207 where it is rejected and returned, as described above, or is passed to actuate lever 209 of switch 211 from which it passes through chute 213 and moves actuator 215 of switch 217. From here the coin goes to the coin safe 127 instead of to a magazine because dimes are not returned in change. It will have momentarily closed the switches in succession to provide two impulses on the accumulator.

As will be seen from Figure 21, the nickel magazine is provided with a seeker 219 which operates a lever 221 of switch 223 (Figure 18) to prevent the reception of any coins should the reserve of nickels fall below the level of the seeker. A similar switch 224 (Figure 41) is provided for the quarter tube.

This is accomplished by means of a reject pin 225 which is mounted on armature 227 of magnet 229 (Figures 7 and 18) and which enters the slug rejector in a position to deflect any coin passing through it into the reject chute to be returned to the depositor. The pin is held in rejecting position by spring 231 and is held out of this position by the magnet which is energized by switch 223. The latter is held closed only so long as there are sufficient coins in the magazine to make change.

A similar seeker and switch (Figure 41) are supplied for the quarter magazine and similar reject pins 228, 230 and magnets 232, 234 are provided for the dime and quarter rejectors. All of the reject relays are responsive to either of the switches since the switches are in series.

*Clearing*

Should the coin passages become clogged with a spurious coin or other material, it becomes necessary to clear them. This is accomplished by pushing on rod 139 (Figures 2 and 7) and overcoming spring 233. Roll 235 cams projection 237 over and chute 173 opens, rotating on rod 177. Ears 239 and 241 on chutes 171 and 175 are lifted by chute 173 and these are opened. The chutes thus discharge by gravity any foreign objects.

A mechanism (not shown) also operated by rod 139 opens all three rejectors in a known manner to eject objects from them.

The springs on the rejectors and springs 179 and 233 restore the parts to normal.

COIN EJECTION (Figures 18, 19 and 21)

The nickel and quarter magazines 205 and 193 are provided with coin ejection slides 243 and 245 which have similar actuating means and therefore only the nickel means will be described.

It will be seen from Figure 18 that the nickel slide 243 has an upturned end 248 which is connected to the armature 249 of the solenoid 251, and a spring 253 is connected at one end to a fixed lug 255 and at the other end to 248.

The slide has an opening 257 to receive one coin. The slide is positioned by spring 253 with the opening 257 under tube 205. When the solenoid is energized, the slide is displaced so that the opening is over the ejection tube 259 so that a coin will be withdrawn from the magazine and discharged through tube 259.

The latter discharges into the coin return chute 133 as shown in Figure 19 so that the coin will be returned to the customer as change.

Any overflow coins from the magazine pass from the top thereof through a chute 261 and are discharged through a tube 263 into a chute 265 which empties into the coin safe 127. The chute 265 also conducts dimes from the point of discharge from switch lever 215 and housing 267 to the safe.

A similar chute for overflow quarters (not shown) terminates in tube 269 over chute 265 to deposit such quarters in the safe. The quarter payout solenoid is indicated by numeral 252 Figure 41.

ACCUMULATOR—163

(Figures 4, 8, 9, 10, 11 and 14)

As indicated above, the deposit of an acceptable coin results in the production of a single impulse for a nickel and two spaced impulses for a dime. In a manner to be described, the quarter produces five spaced impulses.

The accumulator unit 163 accumulates all of the impulses and sets up a credit equivalent to the total thereof.

As shown, particularly in Figures 4 and 11, this unit comprises a support plate 271 which is fixed to the base 155 and which carries on spacers 273 and bolts 275 a contact plate 277 of insulating material.

The support plate is perforated at 279 and has a long bushing 281 fixed in place thereon.

A shaft 283 is rotatably mounted in the bushing and carries on one end a ratchet 285 and on the other end an indicator dial 287 which is graduated in 5¢ increments 288 as shown in Figure 14.

A pointer 289 is fixed on plate 277 and cooperates with the graduations to show the existing accumulated credit.

Fixed to an intermediate portion of the shaft is an insulated hub 291 to which are fixed three wipers 293, 294 and 295 all in electrical contact. The wipers have disc like hubs 296 which serve as a slip ring for a brush 297 fixed to plate 277.

Figure 8:
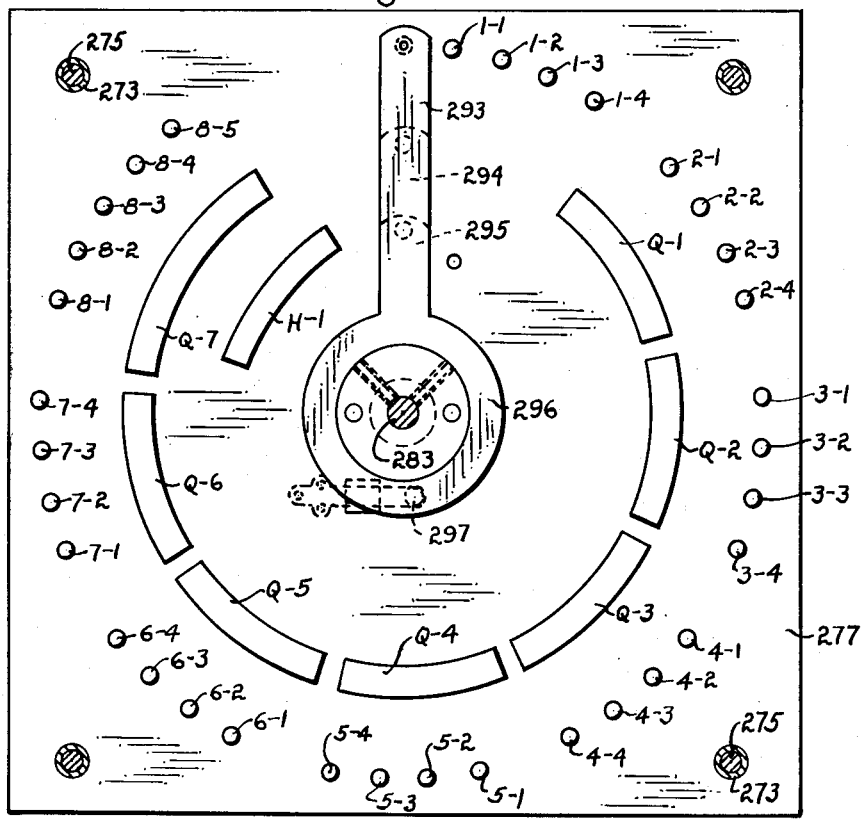
Figure 8 is an elevation of the credit switching mechanism.

It will be seen from Figure 8 that the plate 277 has fixed to it in an outer circle, seven groups of nickel contacts, each group comprising four contacts, and one group of five contacts. For clarity these contacts will be identified by group and contact numbers, as 1—1, 1—2, - - -, 8—4, etc.

The contact 1—1 is disposed one step to the right of the zero position of the wiper 293. A gap of one step is provided between each group. The wiper moves approximately 8 degrees for each step.

Disposed on the inner circle are seven quarter strips, Q–1, Q–2, etc. which are contacted by wiper 294.

It will be seen that the contact strip Q–1 is positioned so that it will be contacted by wiper 294 after 293 steps off from contact 1—4 and it continues far enough so that it will still be contacted by wiper 294 when 293 is on 2—4. Upon the next step wipers 293 and 294 will move off from 2—4 and Q-1, and 294 will move onto Q-2.

The third wiper 295 contacts a holding strip H-1 at the same time that 293 contacts 8-1 and extends six steps beyond the position at which 293 engages contact 8—1 so that when the wiper 293 is on any of the contacts 8—1 to 8—5 the reject relays will be deenergized.

As the shaft 283 is rotated step by step in a clockwise direction (Figure 8), the various contacts and strips will be energized through the brush 297 and the wipers for purposes which will be explained more fully below.

As shown in Figure 14, the contacts and strips have suitable terminals 299 to which wires 301 may be attached, as by soldering.

Figures 9, 10:
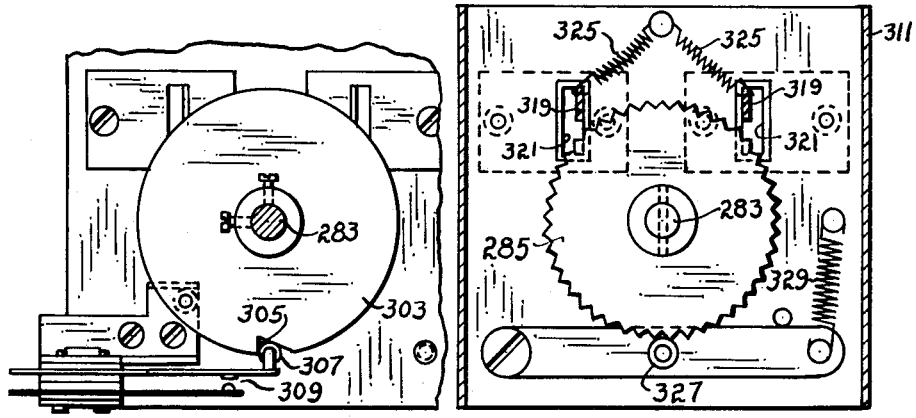
Figure 9 is an elevation, partly in section of the credit adding or subtracting mechanism which operates the credit switching mechanism.
Figure 10 is an elevation of the zeroizing switch.

ZERO CONTROL (Figures 4, 10 and 11)

The zero control comprises a disc 303 fixed to shaft 283 adjacent bushing 281. It has a single notch 305 which receives a roller 307 on the actuator of a switch 309. The roller occupies the notch to open the switch only when the wipers 293, 294 and 295 are in the zero position.

STEPPING MECHANISM (Figures 4, 9 and 11)

The ratchet 285 on shaft 283 is provided with approximately 45 teeth and is actuated in opposite directions to rotate shaft 283 to increase or decrease the accumulated total on the contacts just described.

A U-shaped bracket 311 is fixed to the plate 271 and supports the adding magnet 313 and the subtracting magnet 315.

Each magnet has an armature 317 which carries a pawl 319, the end of which is guided in a slot 321 in plate 271 and is disposed to contact ratchet 285 at one or the other of its sides.

The subtracting magnet 315 rotates shaft 283 counterclockwise as viewed in Figure 8 and clockwise as viewed in Figure 14, while magnet 313 moves it in the opposite direction.

Springs 323 normally retract the armatures and pawls from the ratchet.

Springs 325 (Figure 9) lift and shift the pawls toward each other in preparation for a succeeding step and holding pawl 327 is urged by spring 329 toward the ratchet to hold it in stepped position.

CONTROL PANEL (Figures 4, 5, 6, 11, 15, 16, 17)

Referring to Figure 5, the control devices are mounted on the wall 157 and comprise relays and switch operators, the operation of which will be correlated in connection with the explanation of the circuits.

Numeral 331 indicates a motor relay which has a single pair of normally open points 333.

The zero contact relay 335 also has a single pair of normally closed contacts 337.

A gas switch relay 339 has three sets of contacts 341, 343 and 345. Contacts 341 and 343 are normally open and 345 normally closed.

The quarter relay 347 has five sets of contacts 349, 351, 353, 355 and 357, of which 357 are normally closed and the rest normally open.

A step down relay 359 has four pairs of contacts 361, 363, 365 and 367. Two of the contacts of the pairs 365 and 367 are common so that when 365 are closed, 367 are opened and vice versa. Contacts 367 are normally closed while the rest are normally open.

A line relay 369 has four sets of contacts 371, 373, 375 and 377. The contacts of each set of contacts of 375 and 377 are operated together so that when 375 are closed 377 are open and vice versa. Contacts 377 are normally closed and the rest normally open.

A reject control relay 379 has one pair of normally open contacts 381.

The quarter jack-pot relay 383 (See Figures 6 and 11) is mounted under the accumulator on wall 271 and has two sets of contacts 385 and 387 which are normally closed. This relay has a latch 389 which is adapted to engage the armature 391 and hold both contacts open after the relay has been even momentarily energized. The latch must be manually released before the contacts will reclose.

A payout motor relay 393 has two sets of normally open contacts 395 and 397.

A five and ten cent jack-pot relay 399 mounted on wall 157 has one set of normally closed contacts 401 and one set of normally open points 403. This is a latching relay of the type shown in Figure 6 and must be manually released if the relay is energized even momentarily.

A step down break relay 405 is mounted on the wall 157 and has two sets of normally open points 407 and 409 and one set of normally closed contacts 411. The center contact of 409 and 411 is common to both so that when 409 is closed 411 is opened.

An accumulator clearing motor 413 is mounted on the wall and drives a seven lobe cam 415 which closes a normally open switch 417.

A quarter motor 419 (see Figures 5, 15, 16 and 17) is mounted on the wall and simultaneously drives a single lobe dwell cam 421 which controls a normally open switch 423; a single lobe cam 425 which controls a normally open switch 427; a single lobe cam 429 which controls a normally closed switch 431 and a five lobe cam 433 which controls a normally open switch 435.

CHANGE PAYOUT CONTROL UNIT—165

(Figures 4, 5, 30 to 39 and 41)

This unit comprises a motor 437 which drives a shaft 439 to which are fixed a plurality of cams having from one to seven lobes, said cams being indicated by numerals 441 to 447 inclusive, Figures 30 to 36 inclusive. The shaft is supported in a bracket 449 which is mounted on base 155.

Each cam operates a normally open switch 451 to 466 inclusive which are mounted on the base.

MISCELLANEOUS ELEMENTS

As shown in Figures 4 and 41, a single pair of normally open contacts 467 are mounted to be operated by the armature of the adding magnet 313. When the magnet is energized, the switch is closed. The purpose of this switch is to energize the 5¢ and 10¢ jack-pot relay 399 in case the adding magnet is held energized when dispensing is started. The simultaneous closure of this switch and the subtracting switch 107 energizes the jackpot relay 399.

A lamp (not shown) for heating the mechanism is inserted in the socket 469 (Figures 4 and 41) and serves to eliminate condensation within the unit due to fluctuations in atmospheric temperatures.

Similarly a fuse socket 471 is connected to one side of the main to protect the apparatus from overloads.

The manual to automatic switch mechanism 149 comprises a manually operated cam 473 (Figures 20 and 40) which is supported on the inside of the pedestal 121 and which is movable between two positions to set the dispenser for either coin or manual operation.

In the position shown in these figures, the cam is in the "coin operation" position. The switches 475 and 479 are normally open but are held closed and switch 477 is normally closed but is held open by the cam. The switch operator is, of course, accessible only to an authorized operator.

When the cam is rotated 45 degrees clockwise from the position shown, the switches 475 and 479 will be opened and 477 closed and the dispenser may be operated as a conventional unit. The coin mechanism is totally disabled and any coins inserted therein will be returned.

A line relay 481 is supplied to close the switch 483 for a purpose to be described below. This relay is responsive to current value rather than to voltage just as is line relay 369.

Numeral 147 represents a plug-in type of connector which enables the unit when inserted in housing 121 to be readily connected with the stationary portions of the circuits.

Two normally open switches 484 and 485 are mounted on plate 271. Switch 484 is adapted to energize the nickel payout solenoid 251 once for each actuation and 485 is adapted to similarly energize the quarter solenoid 252 so that the coins can be removed from the coin tubes for auditing. These switches are accessible only to an authorized person because they are enclosed in housing 121.

Normally open, manual switch 487 is a coin reject switch which serves to energize the coin reject relays 229, 232 and 234 when no coins are in the magazines so that the latter may be filled by coins inserted in the coin slot.

Manually operated switch 489 is a 25¢ tube filling switch and is normally closed. It is opened while filling the 25¢ magazine so that no credit is set up on the pump.

Normally closed, manually operated coin tube filling switch 491 when opened enables coins to be inserted through the coin slots for filling the nickel magazine without setting up a credit.

WIRING DIAGRAM (Figures 40 and 41)

Assuming that cam 473 is set to the "automatic" position shown in Figure 40, with switches 475 and 479 closed, the one side of the main 2 or "hot line" is extended through line relay 481; to line relay contacts 483; to switch 475; to switch 107; the plug connector 147; fuse socket 471 (Figure 41) and thence to the normally closed contacts 411 of the step down break relay 405; through step down break relay 405 to normally closed contacts 367 of the step down relay 359 which energizes relay 405; to one side of each of the clearing motor 413, the quarter motor 419, the quarter jack-pot relay 383 and the reject control relay 379.

This line is also extended to the contacts 381 of the reject control relay 379 and to one side each of the motor relay 331 and its normally open contacts 333; to the normally closed contacts 337 of the zero contact relay 335; to the gas switch relay 339 and to one side of contacts 341 thereof; to the quarter relay 347; and to the step down relay 359 and one of the contacts of switch 361 thereof.

From the fuse socket 471, the main 2 is extended to the heat lamp socket 469; to the nickel and quarter payout solenoids 251 and 252; to the adding magnet 313; and to the payout cam motor 437.

The other side of the main 4 or the "ground line" is extended to the solenoid control valve 11; to the pump motor 27; to the plug connector 147; to the normally open contacts 403 of the 5¢ and 10¢ jack-pot relay 399; to the center contact of the switches 375 and 377 and the switch 373 of the line relay 369; to the center contact of switches 365 and 367 of the step down relay 359; to the normally open switch 349 of the quarter relay 347; to the normally open switch 343 of the gas switch relay 339 and to the zero contact relay 335. From the plug 147, line 4 is also extended to the switches 423, 427, 431 and 435 of the quarter motor 419; to the heat lamp socket 469; to the switches 484, 485 and 487; and to the 25¢, 5¢ and two 10¢ coin switches 192, 201, 211 and 217.

From the heat lamp socket 469, the line 4 is extended to the switches 465 and 466 and the center pole of switches 463 and 464 of the payout unit 165; to the quarter tube switch 224; and to the switch 467 operated by adding magnet 313.

From the junction above the heat lamp socket 469, the line 4 is extended to the brush 297 and hub 296 of the accumulator wipers 293, 294 and 295; to the zero switch 309 and to the subtracting relay 315.

Circuit A which is normally energized, extends from main 2 through the step down break relay 405, normally closed switch 367 of the step down relay 359 to main 4.

This closes switches 407 and 409 and opens switch 411. Switch 409 conditions the circuit V, described below, for operation and switch 407 closes circuit E, as described below.

Circuit B is normally energized as follows: main 2 at normally closed switch 381 of reject control relay 379, by line 12 to coin reject relays 229, 232 and 234, thence by line 14 to the normally closed switch 385 of the quarter jack-pot relay 383, thence through line 16 to the nickel tube switch 223, line 18, quarter tube switch 224 to the other main 4.

The reject pins 225, 228 and 230 are thus withdrawn from the coin passages so that coins may be accepted. Should any one of the switches be open however the relays will reject all coins.

Deposit of a nickel

Circuit C is established upon deposit of a nickel which momentarily closes coin switch 201. This circuit is from main 4, through switch 201, line 8, through normally closed contacts 401 of the 5¢ and 10¢ jack-pot relay 399, line 10 through the coin tube filling switch 491, through the adding magnet 313 to the main 2.

Thus one impulse is produced on the magnet and the wiper 293 is moved to contact 1—1.

The shaft 283 and zero disc 303 are rotated and switch 309 is closed and a circuit is established through the gas switch relay 339 as follows:

Circuit D from main 4 through switch 309, line 20, normally closed contacts 357 of the quarter relay 347, line 22 to the gas switch relay 339 and to main 2.

Energization of this relay closes switches 341 and 343 and opens 345 to condition certain circuits for subsequent operation as will be described.

Bearing in mind that the step down break relay 405 has been energized upon the application of power and that switches 407 and 409 are closed while 411 is open, closure of switch 309 by the disc 303 closes a circuit as follows:

Circuit E from main 2 through the motor relay 331, line 24 to switch 407 of the step down break relay 405, thence by line 26 to switch 357 of the quarter relay, line 20 to disc switch 309 and to the other main 4.

The motor relay 331 closes its switch 333 to energize a circuit as follows:

Circuit F is from main 2 through the now closed contacts 333 of the motor relay, line 28, contacts 337 of the zero contact relay 335 which parallel switch 333, line 28, line relay 369, plug 147, switch 479, line 30, hose hook switch 25, pump motor 27 to main 4.

The hose hook switch is operable at will and as soon as it is closed, both line relays 481 and 369 are pulled in since they are responsive to a current flow of the magnitude required by the pump motor.

The line relay 481 closes its contacts 483 to establish:

Circuit G from main 2 through the contacts 483, line 82, the disabling switch 105, line 84, the solenoid control valve 11 to the main 4.

This opens the valve 11 and liquid may then be dispensed under control of the nozzle valve subject to complete operation of the register resetting mechanism which controls valve 67 and switch 105.

Pulling in the line relay 369 closes switches 371, 373, 375 and opens 377. Closure of switch 371 conditions the subtracting magnet for operation by the subtracting switch 101 through the following circuit:

*Circuit H* from main 2 through the normally closed switch 107 (Figure 40), line 86, the subtracting or credit reduction switch 101, line 88 through connector 147, contacts 371 to the subtracting magnet 315 and thence to main 4.

Thus each time switch 101 is closed during dispensing, the magnet 315 will be energized.

Before proceeding further, the matters of adding additional coins and of resetting should be explained.

Assuming that additional dime and quarter coins are inserted prior to closing the hose hook switch 25, in order to build up additional credit beyond the nickel credit already explained, the following process is followed:

*Deposit of a dime*

A dime deposited will close switch 211 and thereafter switch 217. Since these switches are parallel across lines 4 and 8 with the nickel switch, the results described above for the deposit of a nickel will be had with the exception that two impulses will be created in the adding magnet 313 and the arm 293 will be advanced two contacts. This is true whether or not a nickel or other coin has been previously deposited.

Assuming that a nickel has been deposited, the arm 293 will be moved from contact 1—1 to contact 1—3.

*Deposit of a quarter*

The deposit of a quarter requires the production of five impulses of the adding magnet 313. Since it is difficult to operate five switches with one coin, the quarter switch 192 closes a circuit as follows:

*Circuit J* from main 4 through quarter switch 192, line 90, quarter break switch 489, the quarter motor 419 and to main 2.

This starts the quarter motor which makes one revolution as will be described.

In setting up circuit J, a circuit is also formed through the quarter relay as follows:

*Circuit K* from line 90 (Figure 40), which is now hot, by way of line 92 to the quarter relay 347 and to the other main 2. Line 92 is also extended to switch 351 of this relay.

Pulling in the quarter relay closes switches 349, 351, 353, 355 and opens 357 in circuit D to deenergize the gas switch relay. This prevents simultaneous dispensing and credit addition when the hose hook switch has been left closed from a previous delivery.

Closure of switch 351 sets up a holding circuit through the quarter relay as follows:

*Circuit L* from main 2, through quarter relay 347, line 92, switch 351, line 94 to switch 431 of the quarter motor 419 which is closed to the other side of the line 4.

Closure of switch 351 also sets up a holding circuit for the quarter motor as follows:

*Circuit M* from main 2, through the quarter motor 419, line 90 to line 92, through switch 351, line 94, switch 431 to the main 4. The motor will thus continue to operate and in so doing the cam 433 closes and reopens switch 435 five times.

*Circuit N* is a shunt circuit, that is the switch 435 is connected in parallel with the nickel and dime switches 201, 211 and 217 from main 4 through switch 435, line 96, the now closed switch 353 of the quarter relay 347, line 98 to the contacts 387 of the quarter jack-pot relay 383, thence by line 32 to line 8, contacts 401 of the jack-pot relay 399, line 10, closed switch 491 and adding magnet 313 to main 2.

Thus there will be five impulses set up in circuit C and the adding magnet will be energized five times to advance arm 293 over five more points.

Since a nickel and a dime had been previously inserted, the credit is now built up to 40¢ with the result that contact 294 is now resting upon the quarter strip Q-1 and contact 293 is resting on contact 2–3.

The motion of the quarter motor closes a circuit through switch 423 to the reject control relay as follows:

*Circuit O* is from main 4 through switch 423, line 34 to the reject control relay 379 and to the other main 2.

A shunt circuit for switch 423 is also set up by switch 349 of the quarter relay 347 as follows:

*Circuit P* from main 4, through switch 349, and line 36 to line 34, reject control relay 379 to line 2.

Energization of the reject control magnet opens switch 381 and breaks circuit B to the coin reject relays so that any coins deposited will be returned.

The reason for two circuits here is that while the quarter relay 347 is energized immediately upon deposit of a quarter, it is deenergized by switch 431 before completion of the motor cycle, therefore the switch 423 must hold the reject relay energized until the cycle of motor 419 is completed.

On the other hand, the motor operated switch 423 is not operated immediately upon the deposit of a quarter and therefore the switch 349 is provided. Coins are thus rejected during the entire cycle of the quarter motor so that there will be no loss of credit to the customer due to the rapid deposit of coins.

Further, there is the possibility that the closure of test switch 427 might coincide with the closure of a coin operated switch if coins were accepted while the motor is in operation, which would close circuit Q or R to disable the machine as will be described.

The cam 429 opens switch 431 to deenergize 347 and the quarter motor. This opens switch 351 and the motor coasts. During this coast, switch 431 is reclosed, but is ineffective because 351 is open and thereafter cam 421 opens switch 423 which remains open. The device is thus conditioned for a new cycle.

JACK-POT PREVENTION

*Quarter*

Just prior to stopping of the motor 419, after switch 431 is opened, but before switch 423 is opened, the test switch 427 is closed by cam 425 and reopened. If the quarter switch 192 is held closed or relay 347 is stuck when switch 427 is closed, this sets up a test circuit as follows:

*Circuit Q* from main 4 through test switch 427, line 38 through contacts 355 of the quarter relay 347 if they are closed, thence to the quarter jack-pot relay 383 and the other main 2.

The quarter relay should by this time be deenergized as explained above, but in the event any coin switch or any other switch controlling this relay should be accidentally held closed, the jack-pot relay will be pulled in and locked to hold switches 385 and 387 open.

These switches control circuits B and N which include coin reject relays and the adding magnet so that if they are opened, all coins deposited will be rejected and the adding magnet cannot be operated.

The quarter jack-pot relay 383 must be manually released after the defect has been cleared before further coins can be deposited.

If such a jack-pot relay were not provided, the sticking of the coin switch or the quarter relay would cause the quarter motor to continue to run and accumulate credit.

*Nickel and dime jack-pot*

*Circuit R* controls the nickel and dime jack-pot relay 399 as follows: from main 4 through switch 467 (which is actuated by the adding magnet), line 42 to relay 399, line 44 to line 88 (described in circuit H), thence through plug 147, subtracting switch 101, line 86, switch 107 to main 2.

Should any of the nickel or dime switches be held closed, the adding magnet would be held energized and this would hold switch 467 closed. Thereafter when a delivery is attempted, upon the first closure of the switch 101, the relay 399 would be energized and locked in to open contacts 401 and to close contacts 403. Contacts 401, also, opens circuit C to deenergize the adding magnet.

Switch 403 closes a circuit as follows:

*Circuit S* from main 4 through switch 403 of the 5¢ and 10¢ jack pot relay to line 34, thence to the reject control relay 379 and to main 2.

This relay opens switch 381 to deenergize circuit B which controls the reject relays and all coins subsequently inserted will be rejected.

It should be noted that no coin payout or delivery functions are interfered with by the jack-pot relays so that even though one is locked out, the customer will receive the product for which he has paid, or change.

Were this relay not provided and a nickel or a dime stuck, the action of the subtracting magnet would be mechanically prevented by the adding magnet and a continuous delivery could be effected.

Coin rejection during dispensing

It will be recalled that the line relay 369 was pulled in when the hose hook switch 25 was closed (see circuit F). It is desirable to prevent posting of additional credit after the time that the switch 25 is closed because of the described interference of the magnets 313 and 315. The coin reject magnets are therefore deenergized by the

*Circuit T* from main 4 through switch 373 of the line relay 369, lines 46, 34, the reject control relay 379 to main 2. This opens switch 381 and deenergizes circuit B and the rejectors enter the chutes.

Coin rejection during credit posting

The accumulator is constructed to post a limited credit. That shown in the drawing is adapted to accept a maximum credit of $2.00.

Assuming that a credit of $1.75 has been set up, the arm 294 will be on quarter strip Q–7. At this point if the customer inserts a nickel, the arm 293 will move to 8—1 to post a credit of $1.80. Should the customer deposit a dime instead of a nickel, arm 293 will move to contact 8—2 for a credit of $1.85. If he deposited a quarter instead of a dime or nickel it would move to 8—5 for a $2.00 credit. In any case after the arm 293 reaches contact 8—1, the deposit of the maximum value coin (one quarter) would move the accumulator beyond its capacity and therefore the machine must reject all coins after this point is reached. A contact strip H–1 is set to be contacted by arm 295 when 293 reaches contact 8—1 and this sets up

*Circuit U* from main 4 through arm 295, strip H–1, lines 48 and 34, reject control relay 379 to main 2. This opens switch 381 and allows the reject pins to enter the chutes.

Credit reduction by dispensing liquid

Assuming that a credit of 40¢ has been accumulated and the hose hook switch 25 is closed, liquid will be dispensed when the register has been reset and the nozzle valve is opened. The meter 7 rotates cam 97 at the rate of one-half revolution for each 5 cents worth of liquid and switch 101 is closed once each half revolution.

When the switch 101 closes the subtracting magnet 315 is energized by circuit H and the brushes or arms 293, 294 and 295 are moved toward the zero position, one step for each closure. The cam 97 is set so that the subtraction is made near the beginning of the delivery of each five cent increment, say after one cent's worth has been delivered. Therefore, a delivery of four cents worth must be made after the arm 293 is returned to zero and the zero switch 309 is opened.

This opening of zero switch 309 deenergizes circuit E through motor relay 331 and breaks contacts 333. Even though this occurs, it will be seen that the opening of switch 309 also interrupts circuit D to deenergize the gas switch relay 339. The normally closed switch 345 of this relay thus recloses.

It will be recalled that the step down break relay 405 is normally energized through switch 367 of the step down relay 359.

The zero contact relay 335 is normally deenergized and switch 337 is normally closed and the motor 27 continues to run.

The last closure of switch 101 is made when there are about four cents worth of product yet to be delivered so that the switch 103, which is closed after all of the product is delivered, will energize

*Circuit V* from main 2, through switch 107, line 86, zero switch 103, line 50, switch 345 of gas switch relay 339, line 52, switch 409 of the step down break relay 405, line 6, the zero contact relay 335 to main 4.

This opens switch 337 and breaks circuit F to stop motor 27. Breaking of the circuit F deenergizes line relay 481 immediately and opens switch 483 to deenergize circuit G through the solenoid valve 11. This stops the flow of gasoline at once and accurately terminates delivery.

The cam 99 leads cam 97 approximately 36 degrees so that 144 degrees after the last closure of subtracting switch 101, switch 103 will be closed to terminate dispensing when the even increment is shown on the register. It should be noted that switch 103 remains closed when dispensing is stopped and that, therefore, the operation can be started only by the deposit of another coin.

Change return

Should the dispensing operation be terminated by opening the hose hook switch 25 before all the credit has been exhausted, the device will issue change for such balance.

It should be noted that when the line relay 369 and gas switch relay 339 were energized by circuits F and D, switches 375 and 341 were closed to energize

*Circuit W* from main 4 through switch 375, line 54, pay out motor relay 393, line 56, switch 341 to main 2.

This closes the normally open switches 395 and 397. When the relay 369 is deenergized by opening the hose hook switch 25, circuit W and switches 395 and 397 are opened. Switch 395 sets up the following circuit:

*Circuit X* from main 2 through gas switch relay 341, line 56, payout motor relay 393, line 62, contacts 395 of relay 393, line 64 to normally closed switch 464 and main 4.

This holds the relay 393 energized even when the line relay is deenergized by opening hose hook switch 25 and switch 375 opens to break circuit W. The deenergization of the line relay also closes switch 377 and thus closes

*Circuit Y* from main 4, switch 377, line 58, switch 397, line 60, payout cam motor 437 to the other side 2 of the line. A branch 60' is also extended to the switch 463.

As soon as the motor 437 starts, the normally closed switch 463 which is held open by its cam closes (switch 464 opens at the same time) to establish the circuit through motor 437 as follows:

*Circuit Z* from main 4 through switch 463, lines 60', 60, motor 437 to main 2.

Switch 464 when opened deenergizes payout motor relay 393 to open contacts 395 and 397. Thus the starting circuits for both the relay 393 and motor 437 are broken and as soon as one revolution is made by the motor, switch 463 is opened to stop the motor and 464 is remade to condition the device for another cycle.

As the payout motor revolves, it actuates the cams of switches 451 to 462 inclusive and the cams close and reopen the switches the number of times indicated above.

Switch 451 is connected by wire 70 to each of the contacts 1—1, 2—1 through 8—1; switch 452 to contacts 1—2, 2—2 through 8—2 by wire 72; switch 453 to 1—3 through 8—3 by wire 74; switch 454 to 1—4 through 8—4 by wire 76; switch 455 to contact 8—5 only by wire 78. Switches 456 to 462 are connected by wires 100, 102, 104, 106, 108, 110 and 112 respectively to the quarter contacts Q-1 to Q-7.

Assuming as before, that a credit of 40¢ has been set up and that no product has been dispensed, the arm 294 is resting on contact Q-1 and arm 293 is on contact 2—3.

Upon energization of the motor 437, as described above, switch 456 will be closed once and reopened since its cam 441 has one lobe. Closure of the switch completes Circuit A—A from main 4 through arm 294, contact Q-1, line 100, switch 456, line 68, quarter payout solenoid 252 to main 2.

The payout solenoid is thus energized to eject one quarter.

Closure of the switch 453 sets up

Circuit A—B from main 4 through arm 293, contact 2—3, line 74, switch 453, line 66 to the nickel payout solenoid 251 which is operated three times to eject three nickels because the cam 443 of switch 453 has three lobes.

None of the other switches 451 to 462 are effective since none of the other contacts Q-1 to Q-7 or 1—1 to 8—5 are connected to main 4.

Thus since 40¢ has been ejected, the customer has his money back and the transaction is closed. It is now necessary to recondition the accumulator and this is effected by closure of switch 466 which is operated by a cam 441 having its single lobe set so as to close the switch after all of the switches 451 to 462 have been reopened for the last time. Closure of switch 466 sets up Circuit A—C from main 4 through switch 466, line 114, to clearing motor 413 and main 2 and Circuit A—D from main 4 through switch 466, lines 114, 116, step down relay 359 to main 2.

The relay 359 and motor 413 are energized. The relay closes contacts 363 which energize Circuit A—E from main 2, motor 413, lines 114, 116, contacts 363, line 118, contacts 343 of the gas switch relay 339 to main 4.

This holds the motor 413 energized and it rotates its cam 415 repeatedly to operate switch 417 repeatedly to make and break Circuit A—F from main 2 through the now closed switch 361 of the step down relay 359, line 122, switch 417, line 88, subtracting magnet 315 to main 4.

The magnet moves the arms 293, 294, 295 and disc 303 toward the zero position and when this position is reached switch 309 is opened and circuit D is broken to deenergize the gas switch relay 339. The contacts 341, 343 of this relay are opened and 345 closed.

Circuit A—E is broken by switch 343 so that motor 413 stops.

Circuit X is broken by switch 341 so that the payout motor relay 393 is deenergized.

Circuit V is conditioned for operation by circuit A—D, the contacts 367 are opened and 365 are made to establish Circuit A—G from main 4 through switch 365, lines 124, 46, 34, reject control relay 379 to main 2 to prevent the acceptance of coins during the reconditioning period.

As a protection against the addition of coins during the coin payout cycle, the switch 465 is closed as soon as motor 437 starts to close.

Circuit A—H from main 4 through switch 465, lines 126, 48 and 34, reject control relay 379 to main 2.

In order to prevent operation of the pump motor 27 during operation of the clearing motor after change has been returned, the energization of the step down relay 395 opens switch 367 and breaks circuit A through the step down break relay.

This closes switch 411 and energizes

Circuit A—J from main 2 through sewitch 411, line 6, zero contact relay 335 to main 4.

This opens switch 337 in motor circuit F.

In order that the coin tubes may be emptied by the operator for accounting purposes, the switch 484 is closed to establish Circuit A—K from main 4 through switch 484, lines 128, 66, nickel solenoid 251 to main 2 while switch 485 energizes Circuit A—L from main 4 through switch 485, lines 130, 68, quarter solenoid 252 to main 2.

Repeated operation of the switches will empty the magazines.

The switch 487 is manually operable and when closed parallels the nickel and quarter tube switches so as to energize circuit B and hold the coin reject relays energized in the event the coin tubes are empty, so that the magazines may be loaded through the coin slot.

*Manual control*

If it is desired to operate the pump in the conventional manner, the operator will rotate cam 473 to close switch 477 and open switches 475 and 479. When the hose hook switch 25 is closed it establishes Circuit A—M from main 2 through line relay 481, switch 477, lines 134, 30, hose hook switch 25, motor 27 to main 4.

When the line relay 481 is energized it closes switch 483 and establishes circuit G.

Thus the solenoid valve is opened each time the hose hook switch 25 is closed and dispensing may proceed at will subject only to the completion of the register resetting.

The opening of switch 475 breaks the main 2 which runs to the pedestal and consequently deenergizes all the apparatus located therein.

SUMMARY OF OPERATION

The operator, in preparing the pump for automatic operation, rotates the cam 473 to close switches 475 and 479. This applies power to the control pedestal and energizes step down break relay 405. It also energizes coin reject relays 229, 232 and 234 to withdraw reject pins 225, 228 and 230 from the coin chutes so that coins may be deposited.

The customer will first deposit coins in the coin slot 137. On the deposit of a nickel, the coin closes the nickel switch 201. This will energize the adding magnet 313 to move wiper arm 293 up one step to contact 1—1 and to close switch 309. This energizes motor relay 331 and gas switch relay 339. Further mixed coins can be added until the credit of $1.75 is established. At this point only one more coin can be added because the machine has a $2.00 limit. Prevention of insertion of more than one coin is accomplished by the wiper arm 295 making contact H-1 at $1.80 or more. This energizes the reject control relay 379 which deenergizes the coin reject relays to reject all coins.

The deposit of coins may be stopped at any value between zero and $1.80. The deposit of a dime after the initial nickel will close switches 211 and 217 in that order to energize the adding magnet 313 two distinct times and move the wiper arm 293 two steps to contact 1—3.

The deposit of a quarter will close switch 192. This will energize the quarter relay 347 and quarter motor 419 and establish holding circuits through both. The quarter motor drives a five-lobe cam to close switch 435 five successive times to energize adding magnet 313 a like number of times. This moves the wiper 293 from the contact 1—3 to the contact 2—3 and the wiper 294 to the quarter strip Q-1. When the quarter relay is energized the gas switch relay is broken to prevent energization of the motor 27 prior to completion of posting the credit by the quarter motor.

The motor relay 331 is also deenergized by the quarter relay 347 for the same reason.

The quarter relay 347 closes switch 349 to energize the reject control relay 379 to reject all coins. During the cycle of the quarter motor 419 switch 423 is closed. This holds coin reject relay 379 energized to reject all coins. The switch 431 is opened after switch 435 is opened for the last time and this deenergizes the quarter relay 347 and the quarter motor 419. Deenergization of the quarter relay will energize the motor relay 331 and the gas switch relay 339. Thereafter, the test switch 427 is closed momentarily and reopened so that if, for any reason, the quarter switch 192 is closed or the quarter relay 347 is held energized, the quarter jack-pot relay 383 will be energized and will in turn deenergize the coin reject relays directly. It will also break the circuit to the adding magnet so that this magnet will not be held in the energized position. The quarter motor coasts far enough to reopen test switch 427 and reclose switch 431 to condition the apparatus for another cycle.

Assuming that all of the intended credit has been built up, the customer will then close the hose hook switch 25 and energize the pump motor 27. As soon as the hose hook switch 25 is closed, the line relay 369 is energized which energizes the reject control relay to reject all further coins. It also energizes the payout motor relay 393 to prepare it for paying out any unused credit balance. Closure of the switch 25 also energizes the line relay 481 which opens the solenoid control valve 11.

The liquid pressure, upon being applied to the register resetting piston 51, raises it and resets the register, during which time the push rod 111 opens switches 105 and 107 so that there will be no subtraction of credit due to the closing of switch 101 by the resetting mechanism. The switch 105 also closes the solenoid control valve so that no liquid may be dispensed during this period even though the pump motor is running. Upon completion of resetting, switches 105 and 107 are reclosed and when the nozzle valve 19 is opened liquid will be dispensed.

The meter 7 will drive the register 9 and the cams 97 and 99 so as to close switches 101 and 103 once every half revolution, which is equivalent to five cents worth of liquid. Switch 103 is ineffective because the gas switch relay 339 is energized, breaking switch 345.

Switch 101 will, upon each closure, energize the subtracting magnet 315 which will step the wipers 293, 294 and 295 toward the zero position one step for each closure. The switch 101 is closed upon the dispensing of approximately one cent's worth of gasoline so that when the wipers reach the zero position, four cents worth of gasoline must still be dispensed. When the wipers reach the zero position, the switch 309 is opened and deenergizes the motor relay 331 and the gas switch relay 339. The motor, however, continues to operate because the zero contact relay 335 is deenergized and its switch 337 is closed. Upon completion of the delivery, the switch 103 is closed to energize the zero contact relay 335 and open the switch 337 to deenergize the pump motor 27. Deenergization of the motor deenergizes line relay 481 and the solenoid valve 11 closes. Gas switch relay 339, upon being deenergized, deenergizes the payout motor relay 393. When the pump motor is stopped, the line relay 369 is deenergized to deenergize the reject control relay 379 and energize the coin reject relays so that further coins may be received.

*Coin payout*

Should the customer open the hose hook switch 25 before all of the credit is exhausted, the pump motor 27 is deenergized and the line relay 481 is deenergized to close the solenoid valve 11. Similarly, the line relay 369 is deenergized to close switch 377. Since the payout motor relay is energized and switch 397 thereof is closed, current goes through the payout motor 437 to start same and also to switch 463 which is open. Upon starting of the motor 437, switch 463 is closed to establish a holding circuit through the motor.

The switch 464 is opened to deenergize the payout motor relay 393. Upon starting the motor 437, switch 465 is closed and held closed to energize the reject control relay 379 and reject all coins.

Operation of the motor 437 rotates the cams 441 to 447 one revolution. Certain of the contacts 1—1 to 8—5 and Q-1 to Q-7 will be energized, depending upon the position of the wipers 293 and 294, so that when the switches 451 to 462 are closed by the cams, those switches which are connected to contacts engaged by the wipers will be energized.

Assuming that the wipers 293 and 294 rest on contacts 8—2 and Q-7, the switch 462 which is operated by seven-lobe cam 447 will be closed seven times to energize the quarter payout solenoid 252 seven times and eject seven quarters from the quarter magazine.

Similarly, the switch 452, which is connected with the contact 8—2, will be closed twice by its two-lobe cam 442 to energize nickel payout solenoid 251 twice to pay out two nickels. As soon as all of the switches 451 and 462 have been operated for the last time and reopened, the switch 466 is closed to energize the step down relay 359 and deenergize the step down break relay 405 so that switch 411 thereof will energize the zero contact relay 335 and open switch 337. The step down break relay, upon being deenergized, also opens switch 407 to deenergize the motor relay 331.

Thus there is no possibility of the pump motor 27 or solenoid control valve 11 being energized even though hose hook switch 25 is reclosed.

The step down relay 359 being energized, closes switch 363 to hold the clearing motor 413 energized. This switch also holds the step down relay 359 energized, it being in series with switch 343 of the gas relay switch 339. The gas switch relay is in turn held energized by the switch 309.

The step down relay closes switch 365 to energize the reject control relay 379 to reject all coins during this period. The step down relay 359 also closes the switch 361 which is in series with the switch 417 operated by the clearing motor so that in case the clearing motor stops with switch 417 closed, it will not subtract credit during normal operation because 361 is normally open. Upon closure, the switch 417, thus conditioned, energizes the subtracting magnet 315 and continues to be opened and closed to move the wipers 293, 294 and 295 to the zero position. When this position is reached, switch 309 is reopened to deenergize the gas switch relay 339 which opens switch 343 to deenergize the step down relay. This in turn stops the clearing motor 413. It also deenergizes the reject control magnet so that further coins may be received and reenergizes step down break relay 405 so that the cycle may be repeated.

It will not be noted that the line 88 passes through switch 371 of the line relay 369 so that in the event the cam 97 is stopped with switch 101 closed and the subtracting magnet 315 energized, this circuit will be broken as soon as the hose hook switch 25 is opened and the line relay 369 is deenergized so as to prevent burning up of the subtracting magnet.

In order to check the balance of the coins held in the payout tubes, the operator must repeatedly close switches 484 and 485 which actuate the payout solenoids 251 and 252 respectively to eject the coins from the tubes.

Since the tubes are now empty, the coin level switches 223 and 224 will deenergize the reject relays 229, 232 and 234. In order that these relays may be reenergized to permit the loading of the payout tubes through the coin chutes, the switch 487 is closed to reestablish the circuit to these relays.

In order to prevent building up a credit on the accumulator while reloading the tubes, switch 491 is opened to break the circuit to the adding magnet 313 through the nickel switch 201 and the dime switches 211 and 217, while the switch 489 breaks the circuits through the quarter switch 192 to the quarter motor and quarter relay respectively.

The switches 484, 485 and 487 are reopened and switches 489 and 491 reclosed before the machine can again be operated on coins.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a check operated vending machine, the combination of liquid delivery means, a control device therefor having on and off positions, credit accumulating means, a check operated switch, power means controlled by the switch for actuating said accumulating means to post the value of said check, means operable by said accumulating means upon posting of a credit to condition said device to operate the delivery means, test means operable by said power means after credit posting, a disabling unit, means for normally reopening the check switch upon passage of a check, means including said test means and the check switch, when it is abnormally closed, for energizing said unit, and means operable by the unit for preventing the deposit of further checks.

2. In a liquid dispenser, the combination of dispensing means having a liquid line, a hose hook, a switch operable by said hook to energize said means, a control valve in said line, means responsive to the energization of said dispensing means for opening the valve, said last named means comprising a current responsive relay in series with said switch, a check controlled, credit accumulator, credit substracting means controlled by the dispensing means, a second current responsive relay in series with the switch and means operable thereby to condition the subtracting means for operation.

3. In a liquid dispenser, the combination of dispensing means having a liquid line, a hose hook, a switch operable by said hook to energize said means, a control valve in said line, means responsive to the energization of said dispensing means for opening the valve, said last named means comprising a current responsive relay in series with said switch, a check controlled, credit accumulator, credit subtracting means controlled by the dispensing means, a second current responsive relay in series with the switch and means operable thereby to condition the subtracting means for operation, and additional means operated by said second relay for preventing the deposit of additional checks.

4. In a liquid dispenser, the combination of dispensing means having a liquid line, a hose hook, a switch operable by said hook to energize said means, a control valve in said line, means responsive to the energization of said dispensing means for opening the valve, said last named means comprising a current responsive relay in series with said switch, a check controlled, credit accumulator, credit subtracting means controlled by the dispensing means, a second current responsive relay in series with the switch and means operable thereby to condition the subtracting means for operation, a change return mechanism including energizable means operable through a cycle and connected with said accumulator for control thereby, and means conditioned by said second relay for energizing said energizable means upon deenergization of the dispensing means by the hose hook switch.

5. In a vending machine a credit accumulator comprising a plurality of spaced groups of spaced contacts, a series of spaced strips, each strip extending from a position adjacent the space between two groups to one adjacent the last contact of the second of said two groups, in ascending order, a plurality of switches, one of said switches being connected to all of the contacts having the same position in the groups, a cam for each switch having a number of lobes equal to the number of the position of the connected contacts in the groups, a switch connected to each strip, a cam for each switch having a number of lobes equal to the number of the position of the strip in the series, a pair of check magazines, ejectors therefor, means connecting one ejector to the contact switches and the other to the strip switches, wipers for the contacts and the strips respectively, stepping means for moving the wipers from initial position, means responsive to the deposited check for energizing said stepping means in accordance with the increment value of the check, means for connecting said wipers and ejectors to opposite sides of a power source and means for rotating said cams to energize the ejectors in accordance with the number of lobes on the cams operating the switches selected by said wipers.

6. The apparatus as defined in claim 5 together with means for returning the wipers to initial position, said returning means being operable by said rotating means after completion of operation of the ejectors.

7. In a check operated liquid dispenser, the combination of a check operated switch, a motor and a relay, means including said switch for energizing said relay and motor, means operable in response to the energization of the motor and relay for holding them energized, means operable by the motor and relay for preventing the insertion of additional checks, a credit accumulator, means operable by the motor for posting credit on the accumulator proportional to the value of the check, said holding means being released by said motor after completion of credit posting to deenergize the motor and relay, means operable by the motor after it is deenergized, for testing the normally ineffective energizing means, means including a device operable to disable the credit posting means and to operate said preventing means, and means including said energizing and testing means for operating said device if the energizing means is effective when said testing means is operated.

8. In a check operated liquid dispenser, the combination of a check operated switch, a motor and a relay, means including said switch for energizing said relay and motor, means operable in response to the energization of the motor and relay for holding them energized, means operable by the motor and relay for preventing the insertion of additional checks, a credit accumulator, means operable by the motor for posting credit on the accumulator proportional to the value of the check, said holding means being released by said motor after completion of credit posting to deenergize the motor and relay, means operable by the motor after it is deenergized, for testing the normally ineffective energizing means, means including a device operable to disable the credit posting means and to operate said preventing means, means including said energizing and testing means for operating said device if the energizing means is effective when said testing means is operated, and manually releasable means for holding said device operated.

9. In a check operated vending machine, the combination of liquid delivery means, a control device therefor having on and off positions, check operated means movable from an initial position for accumulating a credit in accordance with the value of the checks deposited and for conditioning the device for operating the delivery means upon movement to its on position, means responsive to the delivery means for subtracting from said accumulated credit the value of the liquid delivered, means responsive to return of the device to off position for returning change, said change return means being operable through a cycle and being conditionable to deliver various amounts of change, means connecting said credit accumulating means to condition the change return means to deliver change in an amount equal to the credit remaining on the accumulating means, means for restoring said accumulating means to initial position and means actuated by said change return mechanism, near the end of its cycle, for actuating said restoring means.

10. The apparatus defined in claim 5 together with means for dispensing liquid, means under control of the accumulator for starting said dispensing means, stepping means for moving the wipers toward initial position in accordance with the increment value of the liquid dispensed, means operable at will for stopping the dispensing means and means operable in response to operation of said stopping means to energize the cam rotating means.

11. The apparatus defined in claim 5 together with means for dispensing liquid, means under control of the accumulator for starting said dispensing means, stepping means for moving the wipers toward initial position in accordance with the increment value of the liquid dispensed, means operable at will for stopping the dispensing means and means conditioned by the accumulator and operable in response to operation of said stopping means to energize the cam rotating means.

12. In a coin operated liquid dispenser, the combination of coin operated means, a credit accumulator having zero and credit posting conditions, means operable by the coin operated means for operating said accumulator to post a credit proportional to the value of the coin actuating the coin operated means, liquid delivery means comprising a dispensing control element having delivery means starting and stopping positions, means conditioned by the accumulator, when in credit posting condition, for operation by said element when it is moved to the starting position for starting said delivery means, a change payout mechanism, an operative connection between the accumulator and the change payout mechanism for controlling the amount of change paid out by said mechanism, means operable by said element in starting position to condition said mechanism for operation, means operable by said delivery means for subtracting credit from the accumulator in proportion to the value of liquid dispensed and means operable upon movement of said element to stopping position while the accumulator is in a credit posting condition, for energizing said mechanism.

13. In a coin operated liquid dispenser, the combination of coin operated means, a credit accumulator having zero and credit posting conditions, means operable by the coin operated means for operating said accumulator to post a credit proportional to the value of the coin actuating the coin operated means, liquid delivery means comprising a dispensing control element having delivery means starting and stopping positions, means conditioned by the accumulator, when in credit posting condition, for operation by said element when it is moved to the starting position for starting said delivery means, a change payout mechanism, an operative connection between the accumulator and the change payout mechanism for controlling the amount of change paid out by said mechanism, means operable by said element in starting position to condition said mechanism for operation, means operable by said delivery means for subtracting credit from the accumulator in proportion to the value of liquid dispensed, means operable upon movement of said element to stopping position while the accumulator is in a credit posting condition, for energizing said mechanism, and means operable by the payout mechanism after payout, for restoring said accumulator to its zero position.

14. In a coin operated liquid dispenser, the combination of coin operated means, a credit accumulator having zero and credit posting conditions, means operable by the coin operated means for operating said accumulator to post a credit proportional to the value of the coin actuating the coin operated means, liquid delivery means comprising a dispensing control element having delivery means starting and stopping positions, means conditioned by the accumulator, when in credit posting condition, for operation by said element when it is moved to the starting position for starting said delivery means, a change payout mechanism, an operative connection between the accumulator and the change payout mechanism for controlling the amount of change paid out by said mechanism, additional means operable by movement of said element to starting position for preventing the insertion of additional coins, means operable by said delivery means for subtracting credit from the accumulator in proportion to the value of liquid dispensed and means operable upon movement of said element to stopping position while the accumulator is in a credit posting condition, for energizing said mechanism.

15. In a coin operated liquid dispenser, the combination of coin operated means, a credit accumulator having zero and credit posting conditions, means operable by the coin operated means for operating said accumulator to post a credit proportional to the value of the coin actuating the coin operated means, liquid delivery means comprising a dispensing control element having delivery means starting and stopping positions, means conditioned by the accumulator, when in credit posting condition, for operation by said element when it is moved to the starting position for starting said delivery means, a change payout mechanism, an operative connection between the accumulator and the change payout mechanism for controlling the amount of change paid out by said mechanism, means operable by said element in starting position to condition said mechanism for operation, means operable by said delivery means for subtracting credit from the accumulator in proportion to the value of liquid dispensed, means operable upon movement of said element to stopping position while the accumulator is in a credit posting condition, for energizing said mechanism, and means operable by said accumulator upon subtraction of all the posted credit to stop the liquid delivery means and to prevent operation of the payout mechanism by the element when it occupies its stopping position.

16. In a coin operated liquid dispenser, the combination of coin operated means, a credit accumulator having zero and credit posting conditions, means operable by the coin operated means for operating said accumulator to post a credit proportional to the value of the coin actuating the coin operated means, liquid delivery means comprising a dispensing control element having delivery means starting and stopping positions, means conditioned by the accumulator, when in credit posting condition, for operation by said element when it is moved to the starting position for starting said delivery means, a change payout mechanism, an operative connection between the accumulator and the change payout mechanism for controlling the amount of change paid out by said mechanism, additional means operable by movement of said element to starting position for preventing the insertion of additional coins, means operable by said delivery means for subtracting credit from the accumulator in proportion to the value of liquid dispensed, means operable upon movement of said element to stopping position while the accumulator is in a credit posting condition, for energizing said mechanism, and means for disabling said preventing means when said element occupies its stopping position.

17. In a coin operated liquid dispenser, the combination of coin operated means, a credit accumulator having zero and credit posting conditions, means operable by the coin operated means for operating said accumulator to post a credit proportional to the value of the coin actuating the coin operated means, liquid delivery means comprising a dispensing control element having delivery means starting and stopping positions, means conditioned by the accumulator, when in credit posting condition, for operation by said element when it is moved to the starting position for starting said delivery means, a change payout mechanism including a payout motor, a motor relay adapted to be energized by said credit posting means, means operable by return of said element to stopping position, including a switch operated by said relay, for starting said payout motor, means operable by said motor and including means conditioned by said accumulator for dispensing coins equivalent to the credit remaining on the accumulator, a clearing motor and a step down relay, a switch operable by the payout motor for momentarily energizing the latter relay and clearing motor, means including a switch adapted to be closed by said accumulator when in credit posted position and a switch operated by said latter relay for holding said latter relay and clearing motor energized, a credit subtracting means for the accumulator including a subtracting device, a circuit for operating the subtracting device including a switch operable by the clearing motor and a switch operated by the latter relay and means operable by said delivery means for operating said credit subtracting means.

References Cited in the file of this patent

UNITED STATES PATENTS

| | | |
|---|---|---|
| 1,356,379 | McDermott | Oct. 19, 1920 |
| 1,582,659 | Baker | Apr. 27, 1926 |
| 1,857,969 | Nelson | May 10, 1932 |
| 1,742,285 | Shannon | Jan. 7, 1933 |
| 1,947,383 | Dayton | Feb. 13, 1934 |
| 2,223,146 | Yeomans | Nov. 26, 1940 |
| 2,256,976 | Ford | Sept. 23, 1941 |
| 2,271,397 | McDermott | Jan. 27, 1942 |
| 2,323,255 | Sutherland | June 29, 1943 |
| 2,325,536 | Osborne | July 27, 1943 |
| 2,354,896 | Weiler | Aug. 1, 1944 |
| 2,347,995 | Dettle | May 2, 1944 |
| 2,358,771 | Hinds | Sept. 19, 1944 |
| 2,370,276 | Warren | Feb. 27, 1945 |
| 2,384,585 | Alexander | Sept. 11, 1945 |
| 2,433,689 | Fry | Dec. 30, 1947 |
| 2,491,900 | Mihalek | Dec. 20, 1949 |
| 2,573,112 | Schneckenburger | Dec. 20, 1949 |
| 2,564,015 | Lillig | Aug. 14, 1951 |
| 2,581,502 | Wallin | Jan. 7, 1952 |

FOREIGN PATENTS

| | | |
|---|---|---|
| 264,943 | Great Britain | Feb. 3, 1927 |
| 354,418 | Great Britain | of 1930 |